United States Patent
McDaniel et al.

(10) Patent No.: US 10,144,829 B2
(45) Date of Patent: Dec. 4, 2018

(54) BITUMEN IN WATER EMULSIONS AND METHODS OF MAKING SAME

(71) Applicant: HALLIBURTON ENERGY SERVICES, INC., Houston, TX (US)

(72) Inventors: Cato R. McDaniel, The Woodlands, TX (US); Kenneth W. Pober, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 434 days.

(21) Appl. No.: 14/893,264

(22) PCT Filed: Jul. 31, 2013

(86) PCT No.: PCT/US2013/052950
§ 371 (c)(1),
(2) Date: Nov. 23, 2015

(87) PCT Pub. No.: WO2015/016886
PCT Pub. Date: Feb. 5, 2015

(65) Prior Publication Data
US 2016/0122544 A1    May 5, 2016

(51) Int. Cl.
| | | |
|---|---|---|
| *C08L 95/00* | (2006.01) | |
| *C07G 1/00* | (2011.01) | |
| *C10L 1/32* | (2006.01) | |
| *C08K 13/02* | (2006.01) | |

(52) U.S. Cl.
CPC .............. *C08L 95/005* (2013.01); *C07G 1/00* (2013.01); *C08K 13/02* (2013.01); *C10L 1/326* (2013.01); *C08L 2555/34* (2013.01); *C08L 2555/50* (2013.01); *C08L 2555/60* (2013.01); *C08L 2555/62* (2013.01)

(58) Field of Classification Search
CPC .... C08L 95/00; C08L 95/005; C08L 2555/00; C08L 2555/34; C08L 2555/50; C08L 2555/60; C08L 2555/62; C08K 13/00; C08K 13/02; B01J 13/00; C07G 1/00; C10C 1/00; C10C 1/20
See application file for complete search history.

(56) References Cited

U.S. PATENT DOCUMENTS

| | | | |
|---|---|---|---|
| 4,578,456 A | 3/1986 | Pober | |
| 4,969,929 A | 11/1990 | Platone et al. | |
| 7,691,982 B2 * | 4/2010 | Tomita ................ | B01F 17/0028 530/500 |

FOREIGN PATENT DOCUMENTS

| | | |
|---|---|---|
| AT | 358977 B | 10/1980 |
| DE | 390434 C | 2/1924 |

OTHER PUBLICATIONS

International Search Report and Written Opinion for PCT/US2013/052950 prepared by the ISA/EP dated Apr. 11, 2014, 8 pages.

* cited by examiner

*Primary Examiner* — Jennifer A Smith
*Assistant Examiner* — Alexandra M Moore
(74) *Attorney, Agent, or Firm* — Haynes and Boone, LLP

(57) ABSTRACT

A method of stabilizing a bitumen-in-water emulsion comprising contacting (i) bitumen, (ii) water, and (iii) an alkoxylated humus material to obtain a stabilized bitumen-in-water emulsion, wherein the alkoxylated humus material comprises an ethoxylated humus material, a C3+ alkoxylated humus material, or combinations thereof. A method of stabilizing a bitumen-in-water emulsion comprising contacting (i) bitumen, (ii) water, and (iii) an alkoxylated humus material to obtain a stabilized bitumen-in-water emulsion, wherein the alkoxylated humus material comprises an ethoxylated lignite, and the bitumen is extracted from the Orinoco Oil Belt in Venezuela. A stabilized bitumen-in-water emulsion comprising bitumen, water, and an alkoxylated humus material wherein the alkoxylated humus material comprises an ethoxylated humus material, a C3+ alkoxylated humus material, or combinations thereof.

20 Claims, No Drawings

BITUMEN IN WATER EMULSIONS AND METHODS OF MAKING SAME

BACKGROUND

This disclosure relates to methods of producing aqueous bitumen emulsions. More specifically, it relates to methods of stabilizing bitumen-in-water emulsions.

Bitumen is an abundant natural resource. The use of a specific bitumen product in an application will depend on the physical and chemical properties of such bitumen product. Generally, bitumen is very viscous and it is often necessary to mix it with various solvents to yield solutions or emulsions for further transportation and use. Thus, there is an ongoing need to develop and improve methods for preparing bitumen solutions or emulsions.

SUMMARY

Disclosed herein is a method of stabilizing a bitumen-in-water emulsion comprising contacting (i) bitumen, (ii) water, and (iii) an alkoxylated humus material to obtain a stabilized bitumen-in-water emulsion, wherein the alkoxylated humus material comprises an ethoxylated humus material, a C3+ alkoxylated humus material, or combinations thereof.

Also disclosed herein is a method of stabilizing a bitumen-in-water emulsion comprising contacting (i) bitumen, (ii) water, and (iii) an alkoxylated humus material to obtain a stabilized bitumen-in-water emulsion, wherein the alkoxylated humus material comprises an ethoxylated lignite, and the bitumen is extracted from the Orinoco Oil Belt in Venezuela.

Further disclosed herein is a stabilized bitumen-in-water emulsion comprising bitumen, water, and an alkoxylated humus material wherein the alkoxylated humus material comprises an ethoxylated humus material, a C3+ alkoxylated humus material, or combinations thereof.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are stabilized bitumen-in-water emulsions (SBWEs) and methods of making same. In an embodiment, the SBWE may comprise bitumen, water, and a sufficient amount of an alkokylated humus material (e.g., an ethoxylated humus material and/or a C3+ alkoxylated humus material) to form a stable emulsion. In an embodiment, SBWEs comprising alkokylated humus materials (e.g., ethoxylated humus material and/or C3+ alkoxylated humus material) of the type described herein may be advantageously transported, stored, and/or used as fuels.

In an embodiment, the SBWE comprises a bitumen. In an embodiment, the bitumen may be comprised of a naturally-occurring material. Alternatively, the bitumen comprises a synthetic material. Alternatively, the bitumen comprises a mixture of a naturally-occurring and synthetic material.

For purposes of the disclosure herein the term "bitumen" will be understood to include geological deposits of natural bitumen and geological deposits of extra-heavy oils. Generally, when the natural bitumen is mobile within the natural reservoir, it is considered to be an extra-heavy oil. Bitumen represents the remnants of very large volumes of conventional oils that have been generated and degraded, mainly by bacterial action. Chemically and texturally, bitumen resembles the residuum generated by refinery distillation of petroleum (e.g., refinery distillation of oil).

In an embodiment, bitumen is generally characterized by high viscosity, high density (low API gravity), and high concentrations of nitrogen, oxygen, sulfur, and heavy metals. The viscosity is highly dependent on the temperature, so a viscosity value for the bitumen in the reservoir compared to the viscosity value for the same bitumen in a stock tank, for example, can be vastly different. The viscosity of bitumen may vary over several orders of magnitude for a variation in temperature of about 25° F. In an embodiment, bitumen may be characterized by an API gravity of from about 4° API to about 20° API and a viscosity of from about 100 cP to about 1,000,000 cP. Bitumen owes its physical properties, such as high viscosity, to its chemical composition. Bitumen comprises mostly large hydrocarbon molecules known as asphaltenes and resins.

Bitumen can be found in natural reservoirs all over the world, with some of the largest reservoirs being located in Canada, Venezuela, Russia and Kazakhstan. In an embodiment, the bitumen is extracted in the Orinoco Oil Belt along the Eastern Venezuela Basin.

In an embodiment, the bitumen may be extracted from its natural reservoir by using any suitable methodology. Non-limiting examples of bitumen extraction methods suitable for use in the present disclosure include surface mining, cold pumping, cold flow, cold heavy oil production, cold heavy oil production with sand, solvent extraction, toe to heel air injection, steam injection, cyclic steam stimulation process, steam assisted gravity drainage, combustion overhead gravity drainage, down-hole electrical resistance heating, and the like, or combinations thereof. The bitumen in the Orinoco Oil Belt is extracted primarily by cold pumping in multilateral or horizontal wells in combination with electric submersible pumps and progressing cavity pumps.

In an embodiment, the bitumen is present within the SBWE in an amount of from about 40 vol. % to about 85 vol. %, alternatively from about 50 vol. % to about 80 vol. %, or alternatively from about 60 vol. % to about 75 vol. %, based on the total volume of the SBWE. In an embodiment, the bitumen is present within the SBWE in an amount of about 70 vol. %, based on the total volume of the SBWE.

In an embodiment, the SBWE comprises water. Water present in the SBWE may be from any suitable source, examples of which include, but are not limited to, tap water, freshwater, water that is potable or non-potable, untreated water, partially treated water, treated water, produced water, city water, well-water, surface water, process water, or combinations thereof. In an embodiment, the water is freshwater. As will be appreciated by one of skill in the art, and with the help of this disclosure, when water is used either as hot water or as steam (e.g., process water) in the production of bitumen, at least a portion of the water present in the SBWE might originate in such process water.

rally-occurring material. Alternatively, the humus material comprises a mixture of a naturally-occurring and synthetic material.

In an embodiment, the humus material comprises brown coal, lignite, subbituminous coal, leonardite, humic acid, a compound characterized by Structure I, fulvic acid, humin, peat, lignin, and the like, or combinations thereof.

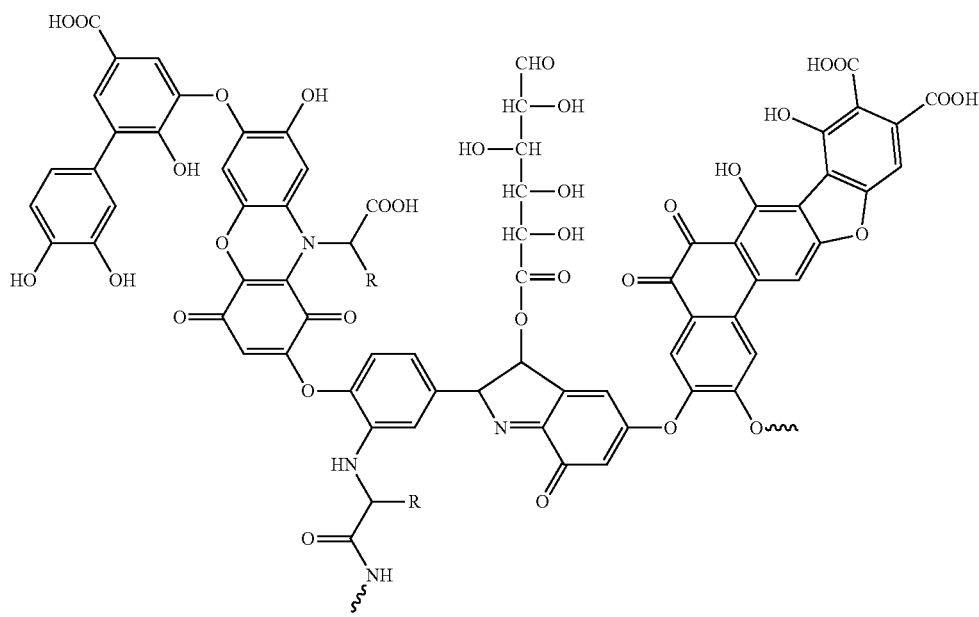

Structure I

The wavy lines in Structure I represent the remainder of the molecule (e.g., a humic acid molecule).

In an embodiment, the water is present within the SBWE in an amount of from about 15 vol. % to about 60 vol. %, alternatively from about 20 vol. % to about 50 vol. %, or alternatively from about 25 vol. % to about 40 vol. %, based on the total volume of the SBWE. In an embodiment, the water is present within the SBWE in an amount of about 30 vol. %, based on the total volume of the SBWE. Alternatively, the water may comprise the balance of the SBWE after considering the amount of the other components used.

In an embodiment, the SBWE comprises an alkoxylated humus material (AHM). In an embodiment, the AHM comprises an ethoxylated humus material (EHM), a C3+ alkoxylated humus material (CAHM), or combinations thereof. In an embodiment, the AHMs may be obtained by heating a reaction mixture comprising a humus material, an alkoxylating agent (e.g., ethylene oxide and/or C3+ cyclic ether), a catalyst and an inert reaction solvent. In an embodiment, the reaction mixture may be heated in a substantially oxygen-free atmosphere to yield the AHMs.

In an embodiment, the reaction mixture comprises a humus material. In an embodiment, the humus material references a brown or black material derived from decomposition of plant and/or animal substances. Generally, humus represents the organic portion of soil that will not undergo any further decomposition or degradation, and which comprises complex molecules resembling or incorporating at least a portion of a humic acid-like structure. In an embodiment, the humus material may be comprised of a naturally-occurring material. Alternatively, the humus material comprises a synthetic material, such as for example a material derived from the chemical modification of a natu- In an embodiment, the humus material comprises brown coal. Brown coal generally comprises a broad and variable group of low rank coals characterized by their brownish coloration and high moisture content (e.g., greater than about 50 wt. % water, by weight of the brown coal). Brown coals typically include lignite and some subbituminous coals. The coal ranks as referred to herein are according to the U.S. Coal Resource and Classification System.

In an embodiment, the humus material comprises lignite. Lignite is generally a soft yellow to dark brown or rarely black coal with a high inherent moisture content, sometimes as high as about 70 wt. % water, but usually comprises a water content of from about 20 wt. % to about 60 wt. %, by weight of the lignite. Lignite is considered the lowest rank of coal, formed from peat at shallow depths, with characteristics that put it somewhere between subbituminous coal and peat.

In an embodiment, the humus material comprises subbituminous coal. Subbituminous coal, also referred to as black lignite, is generally a dark brown to black coal, intermediate in rank between lignite and bituminous coal. Subbituminous coal is characterized by greater compaction than lignite as well as greater brightness and luster. Subbituminous coal contains less water than lignite, e.g., typically from about 10 wt. % to about 25 wt. % water, by weight of the subbituminous coal.

In an embodiment, the humus material comprises leonardite. Leonardite is a soft waxy, black or brown, shiny, vitreous mineraloid that is associated with near-surface mining. Leonardite is an oxidation product of lignite and is a rich source of humic acid. In an embodiment, leonardite may comprises up to 90 wt. % humic acid, by weight of the leonardite.

In an embodiment, the humus material comprises humic acid. Humic acid is produced by biodegradation of dead organic matter and represents one of the major organic compound constituents of soil (humus), peat, coal, and may constitute as much as about 95 wt. % of the total dissolved organic matter in aquatic systems. Humic acid is one of two classes of natural acidic organic polymers that are found in soil, and comprises a complex mixture of many different acids containing carboxyl and phenolate groups. In an embodiment, the humic acid comprises a compound characterized by Structure I. Humic acid can generally be characterized by a molecular weight in the range of from about 10,000 Da to about 100,000 Da.

In an embodiment, the humus material comprises fulvic acid. Fulvic acid is the other one of two classes of natural acidic organic polymers that are found in soil (humus), along with humic acid. Fulvic acid is characterized by an oxygen content about twice as high as the oxygen content of humic acid, and by a molecular weight lower than the molecular weight of the humic acid. Fulvic acid can generally be characterized by a molecular weight in the range of from about 1,000 Da to about 10,000 Da.

In an embodiment, the humus material comprises humin. Humin or humin complexes are another major constituent of soil (humus) along with humic acid and fulvic acid. Humin or humin complexes are very large substances and are considered macro-organic substances due to their molecular weights that are generally in the range of from about 100,000 Da to about 10,000,000 Da.

In an embodiment, the humus material comprises peat. Peat or turf is an accumulation of a spongy material formed by the partial decomposition of organic matter, primarily plant material, e.g., partially decayed vegetation. Peat generally forms in wetland conditions, where flooding obstructs flows of oxygen from the atmosphere, slowing rates of decomposition.

In an embodiment, the humus material comprises lignin. Lignin is a complex oxygen-containing biopolymer most commonly derived from wood. Lignin is the second most abundant organic polymer on the planet, exceeded only by cellulose.

In an embodiment, the humus material may be subjected to a dehydration process (e.g., a water or moisture removal process) prior to adding the humus material to the reaction mixture or to any pre-mixed components thereof. The dehydration of the humus materials may be accomplished by using any suitable methodology, such as for example contacting the humus materials with superheated steam, convection drying, azeotropic distillation, azeotropic distillation with xylene, toluene, benzene, mesitylene, etc. In an embodiment, the humus materials may be dehydrated by heating the humus material (for example, in an oven or dryer such as a rotary dryer) at temperatures of from about 50° C. to about 125° C., alternatively from about 55° C. to about 120° C., or alternatively from about 60° C. to about 110° C. In an embodiment, the humus material suitable for adding to the reaction mixture or to any pre-mixed components thereof comprises a water content of less than about 3.5 wt. %, alternatively less than about 3 wt. %, alternatively less than about 2.5 wt. %, or alternatively less than about 2 wt. %, by weight of the humus material. As will be appreciated by one of skill in the art, and with the help of this disclosure, the dehydration process of the humus material is meant to remove all readily removable water, such that the catalyst would not be inactivated by reacting with water. As will be appreciated by one of skill in the art, and with the help of this disclosure, while it may be desirable to remove all water from the humus material, for practical purposes it may be sufficient to remove water from the humus material down to "tightly-bound water" (e.g., hydration water) level, which tightly-bound water would not be readily available to interact with and inactivate/kill the catalyst.

In an embodiment, the humus material comprises a particle size such that equal to or greater than about 97 wt. % passes through an about 80 mesh screen (U.S. Sieve Series) and equal to or greater than about 55 wt. % passes through an about 200 mesh screen (U.S. Sieve Series); or alternatively equal to or greater than about 70 wt. % passes through an about 140 mesh screen (U.S. Sieve Series) and equal to or greater than about 60 wt. % passes through an about 170 mesh screen (U.S. Sieve Series).

A commercial example of a humus material suitable for use in the present disclosure includes CARBONOX filtration control agent. CARBONOX filtration control agent is a naturally occurring product that displays dispersive/thinning characteristics in water-based drilling fluid systems and is available from Halliburton Energy Services, Inc.

In an embodiment, the humus material is present within the reaction mixture in an amount of from about 1 wt. % to about 50 wt. %, alternatively from about 2 wt. % to about 10 wt. %, alternatively from about 3 wt. % to about 7 wt. %, or alternatively from about 3 wt. % to about 5 wt. %, based on the total weight of the reaction mixture.

In an embodiment, the reaction mixture comprises an alkoxylating agent (e.g., ethylene oxide and/or C3+ cyclic ether). A C3+ cyclic ether refers to a cyclic ether (e.g., an epoxide or a cyclic ether with three ring atoms, generally two carbon ring atoms and one oxygen ring atom; a cyclic ether with four ring atoms, generally three carbon ring atoms and one oxygen ring atom; etc.) that has a total number of carbon atoms of equal to or greater than 3 carbon atoms, alternatively equal to or greater than 4 carbon atoms, alternatively equal to or greater than 5 carbon atoms, alternatively from about 3 carbon atoms to about 20 carbon atoms, alternatively from about 4 carbon atoms to about 15 carbon atoms, or alternatively from about 5 carbon atoms to about 10 carbon atoms. The alkoxylating agent may react with the humus material in the reaction mixture to yield an AHM (e.g., EHM and/or CAHM). Without wishing to be limited by theory, the alkoxylating agent may react with one or more functional groups of the humus materials, such as for example alcohol groups, phenol groups, carboxyl groups, amine groups, sulfhydryl groups, to form the AHM (e.g., EHM and/or CAHM). The alkoxylating agent may alkoxylate the humus material, e.g., introduce alkoxylating elements/groups/branches in the structure of the humus material to yield an AHM (e.g., EHM and/or CAHM). For purposes of the disclosure herein, a single alkoxylating agent (e.g., ethylene oxide, C3+ cyclic ether, a C3+ epoxide, oxetane, etc.) molecule that attaches to a humus material will be referred to herein as an "alkoxy unit" (e.g., an "ethoxy unit," a "C3+ cyclic ether unit," a "C3+ epoxide unit," an "oxetane unit," etc.). In an embodiment, an alkoxylating element comprises one or more alkoxy units, which may be the same or different from each other.

In an embodiment, the alkoxylating agent comprises ethylene oxide, a C3+ cyclic ether, or combinations thereof. In an embodiment, the C3+ cyclic ether comprises oxetane as characterized by Structure II, an epoxide (e.g., C3+ epoxide) compound characterized by Structure III, or combinations thereof,

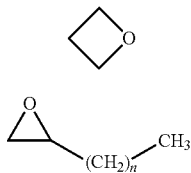

Structure II

Structure III where the repeating methylene (—CH$_2$—) unit may occur n times with the value of n ranging from about 0 to about 3, alternatively from about 0 to about 2, or alternatively from about 0 to about 1.

In an embodiment, the C3+ cyclic ether (e.g., C3+ epoxide) characterized by Structure III comprises propylene oxide as characterized by Structure IV, butylene oxide as characterized by Structure V, pentylene oxide as characterized by Structure VI, or combinations thereof.

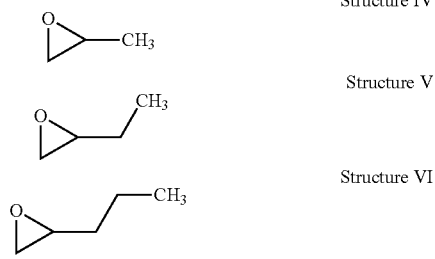

Structure IV

Structure V

Structure VI

In an embodiment, the alkoxylating agent comprises ethylene oxide and the resulting alkoxylated humus material comprises an EHM. In another embodiment, the alkoxylating agent comprises a C3+ cyclic ether and the resulting alkoxylated humus material comprises a CAHM.

In yet another embodiment, the alkoxylating agent comprises ethylene oxide and a C3+ cyclic ether, and the resulting alkoxylated humus material may be a mixed alkoxylated humus material, such as for example a propoxylated/ethoxylated humus material, a butoxylated/ethoxylated humus material, a pentoxylated/ethoxylated humus material, etc. In an embodiment, the weight ratio between ethylene oxide and C3+ cyclic ether may be in the range of from about 10:1 to about 1:10, alternatively from about 5:1 to about 1:10, alternatively from about 5:1 to about 1:1, alternatively from about 1.5:1 to about 1:1, alternatively from about 1:1 to about 1:5, or alternatively from about 1:1 to about 1:2.

In an embodiment, the alkoxylating agent is present within the reaction mixture in a weight ratio of alkoxylating agent to humus material of from about 0.5:1 to about 50:1, alternatively from about 5:1 to about 40:1, or alternatively from about 10:1 to about 30:1.

In an embodiment, the reaction mixture comprises a catalyst. The catalyst may assist in the reaction between the humus material and the alkoxylating agent, but it is expected that the catalyst is not consumed during the chemical reaction (e.g., the alkoxylation of humus materials).

In an embodiment, the catalyst comprises a strong base catalyst. In an alternative embodiment, the catalyst comprises a strong acid catalyst.

Nonlimiting examples of strong base catalysts suitable for use in the present disclosure include sodium methoxide, potassium methoxide, sodium ethoxide, potassium ethoxide, and the like, or combinations thereof.

In an embodiment, the strong base catalyst is present within the reaction mixture in an amount of from about 0.1 wt. % to about 75 wt. %, alternatively from about 0.5 wt. % to about 60 wt. %, or alternatively from about 1 wt. % to about 55 wt. %, based on the total weight of the humus material.

In an embodiment, the strong acid catalyst comprises a mixture of (i) esters of titanic and/or zirconic acid with monoalkanols and (ii) sulfuric acid and/or alkanesulfonic acids and/or aryloxysulfonic acids, wherein the monoalkanols comprise from about 1 to about 4 carbon atoms, and the alkanesulfonic acids comprise from about 1 to about 6 carbon atoms. Nonlimiting examples of alkanesulfonic acids suitable for use in the present disclosure include methanesulfonic acid, ethanesulfonic acid, propanesulfonic acid, butanesulfonic acid, hexanesulfonic acids, or combinations thereof. Nonlimiting examples of aryloxysulfonic acids suitable for use in the present disclosure include phenolsulfonic acid.

In an embodiment, the strong acid catalyst comprises a mixture of (i) HF and (ii) a metal alkoxide and/or a mixed metal alkoxide, such as for example aluminum and titanium metal alkoxides and/or mixed alkoxides. In such embodiment, the metal alkoxides may be characterized by the general formula $M(OC_aH_{2a+1})_b$, wherein M is a metal, b is the valence of the metal M, and each a can independently be from about 1 to about 22 carbon atoms, alternatively from about 1 to about 18 carbon atoms, or alternatively from about 1 to about 14 carbon atoms. In an embodiment, the metal may be selected from the group consisting of aluminum, gallium, indium, thallium, titanium, zirconium and hafnium. In an embodiment, b may be either 3 or 4, depending on the valence of the metal M.

Nonlimiting examples of strong acid catalysts suitable for use in the present disclosure include HF/(CH$_3$O)$_3$Al; HF/(C$_2$H$_5$O)$_3$Al; HF/(CH$_3$O)$_2$(C$_2$H$_5$O)Al; HF/(C$_2$H$_5$O)$_3$Al; HF/(CH$_3$O)$_2$(C$_2$H$_5$O)$_2$Ti; HF/(CH$_3$O)(C$_2$H$_5$O)$_3$Ti; HF/(C$_{20}$H$_{41}$O)$_4$Ti; HF/(C$_{20}$H$_{41}$O)$_3$Al; HF/(i-C$_3$H$_7$O)$_3$Al; HF/(CH$_3$O)$_4$Ti; HF/(C$_2$H$_5$O)$_4$Ti; HF/(i-C$_3$H$_7$O)$_4$Ti; HF/(CH$_3$O)$_4$Zr; HF/(C$_2$H$_5$O)$_4$Zr; HF/(CH$_3$O)(C$_2$H$_5$O)(i-C$_3$H$_7$O)Al; HF/(CH$_3$O)$_2$(C$_2$H$_5$O)(i-C$_3$H$_7$O)Ti; or combinations thereof.

In an embodiment, the strong acid catalyst is present within the reaction mixture in an amount of from about 0.01 wt. % to about 10 wt. %, alternatively from about 0.05 wt. % to about 10 wt. %, or alternatively from about 0.1 wt. % to about 2 wt. %, based on the total weight of the hummus material.

In an embodiment, the reaction mixture comprises an inert reaction solvent, alternatively referred to as an inert diluent. The inert reaction solvent will not react with the catalyst (e.g., will not cause the hydrolysis of the strong base catalyst) and will also not participate in the alkoxylation reaction between the humus material and the alkoxylating agent (e.g., ethylene oxide and/or C3+ cyclic ether), so as to avoid competing side reactions. The inert reaction solvent will not react with any of the reactants (e.g., the humus material, the alkoxylating agent). The inert reaction solvent will not engage in deleterious side reactions which would hinder the reaction between the humus material and the alkoxylating agent (e.g., ethylene oxide and/or C3+ cyclic ether). Without wishing to be limited by theory, the inert reaction solvent provides a liquid medium for the alkoxylation reaction of humus materials, e.g., a liquid medium in which the reactants (e.g., the humus material, the alkoxylating agent) can interact and react. In an embodiment, removal of water and/or dissolved $O_2$ may improve the yield of the alkoxylation reaction.

In an embodiment, the inert reaction solvent may be subject to a dehydration step (e.g., the removal of water), which may be accomplished by using any suitable methodology, such as for example the use of zeolites, azeotropic distillation, pervaporation, and the like, or combinations thereof. In an embodiment, the inert reaction solvent does not comprise a substantial amount of water. In an embodiment, the reaction solvent comprises water in an amount of less than about 1 vol. %, alternatively less than about 0.1 vol. %, alternatively less than about 0.01 vol. %, alternatively less than about 0.001 vol. %, alternatively less than about 0.0001 vol. %, or alternatively less than about 0.00001 vol. %, based on the total volume of the inert reaction solvent.

In an embodiment, the inert reaction solvent may be subject to a deoxygenation step (e.g., removal of dissolved $O_2$), which may be accomplished by using any suitable methodology, such as for example purging an inert gas (e.g., nitrogen, helium, argon, etc.) through the inert reaction solvent (e.g., bubbling an inert gas through the solvent). In an embodiment, the inert reaction solvent does not comprise a substantial amount of dissolved $O_2$. In an embodiment, the reaction solvent comprises dissolved $O_2$ in an amount of less than about 1 wt. %, alternatively less than about 0.1 wt. %, alternatively less than about 0.01 wt. %, alternatively less than about 0.001 wt. %, alternatively less than about 0.0001 wt. %, or alternatively less than about 0.00001 wt. %, based on the total weight of the inert reaction solvent.

Nonlimiting examples of inert reaction solvents suitable for use in the present disclosure include $C_6$-$C_{12}$ liquid aromatic hydrocarbons; toluene, ethylbenzene, xylenes, o-xylene, m-xylene, p-xylene, trimethylbenzenes, cumene (i.e., isopropylbenzene), mesitylene (i.e., 1,3,5-trimethylbenzene), 1,2,4-trimethylbenzene, 1,2,3-trimethylbenzene; and the like, or combinations thereof.

As will be appreciated by one of ordinary skill in the art, and with the help of this disclosure, the term "solvent" as used herein does not imply that any or all of the reactants are solubilized in the inert reaction solvent. In an embodiment, the humus material and the catalyst are less than about 25 wt. % soluble in the inert reaction solvent, alternatively less than about 20 wt. %, alternatively less than about 15 wt. %, alternatively less than about 10 wt. %, alternatively less than about 5 wt. %, alternatively less than about 4 wt. %, alternatively less than about 3 wt. %, alternatively less than about 2 wt. %, alternatively less than about 1 wt. %, based on the weight of the inert reaction solvent. In an embodiment, the reaction mixture comprises a slurry comprising the humus material, the alkoxylating agent (e.g., ethylene oxide and/or C3+ cyclic ether), the strong base catalyst and the inert reaction solvent. In another embodiment, the strong acid catalyst may be soluble in the inert reaction solvent. In yet another embodiment, the reaction mixture comprises a slurry comprising the humus material, the alkoxylating agent (e.g., ethylene oxide and/or C3+ cyclic ether), the strong acid catalyst and the inert reaction solvent.

In an embodiment, the inert reaction solvent is present within the reaction mixture in an amount of from about 30 wt. % to about 90 wt. %, alternatively from about 30 wt. % to about 70 wt. %, alternatively from about 35 wt. % to about 65 wt. %, alternatively from about 40 wt. % to about 60 wt. %, or alternatively from about 45 wt. % to about 55 wt. %, based on the total weight of the reaction mixture. Alternatively, the inert reaction solvent may comprise the balance of the reaction mixture after considering the amount of the other components used.

In an embodiment, the AHM (e.g., EHM and/or CAHM) may be produced by heating a reaction mixture comprising a humus material, an alkoxylating agent (e.g., ethylene oxide and/or C3+ cyclic ether), a catalyst and an inert reaction solvent. In an embodiment, the reaction mixture may be heated by using any suitable methodology (e.g., a fired heater, heat exchanger, heating mantle, burners, etc.) to a temperature ranging from about 130° C. to about 170° C., alternatively from about 140° C. to about 160° C., or alternatively from about 145° C. to about 155° C. In an embodiment, the reaction mixture may be heated to a temperature of about 150° C.

In an embodiment, the reaction mixture may be heated (e.g., reacted) in a substantially oxygen-free atmosphere. For purposes of the disclosure herein, the term "atmosphere" refers to any space within the reaction vessel that is not occupied by the reaction mixture or any parts of the reaction vessel (e.g., a stirring device), for example a head space within a reactor vessel. In an embodiment, a substantially oxygen-free atmosphere comprises oxygen in an amount of less than about 1 vol. %, alternatively less than about 0.1 vol. %, alternatively less than about 0.01 vol. %, alternatively less than about 0.001 vol. %, alternatively less than about 0.0001 vol. %, or alternatively less than about 0.00001 vol. %, based on the total volume of the atmosphere in which the alkoxylation of the humus materials is carried out.

In an embodiment, the substantially oxygen-free atmosphere may be obtained by using any suitable methodology, such as for example purging a reaction vessel comprising the reaction mixture or any components thereof with an inert gas, i.e., a gas that does not participate in the alkoxylation reaction. For example, the reaction mixture may be maintained under an inert gas blanket for the duration of the alkoxylation reaction. Nonlimiting examples of inert gases suitable for use in the present disclosure include nitrogen, helium, argon, or combinations thereof.

In an embodiment, the components of the reaction mixture (e.g., the humus material, the alkoxylating agent, the catalyst and the inert reaction solvent) may be heated while being mixed together, and the heating may continue for the duration of the chemical modification reaction (e.g., alkoxylation of humus materials). In another embodiment, all components of the reaction mixture (e.g., the humus material, the alkoxylating agent, the catalyst and the inert reaction solvent) may be mixed together to form the reaction mixture prior to heating the reaction mixture. In an alternative embodiment, at least two components of the reaction mixture are pre-mixed and heated prior to the addition of the other components. In some embodiments, the humus material, the alkoxylating agent, and the catalyst may each be pre-mixed individually with a portion of the inert reaction solvent and heated, and then they may be mixed together in any suitable sequence to form the reaction mixture. In an embodiment, the mixing or pre-mixing of any of the components of the reaction mixture (e.g., the humus material, the alkoxylating agent, the catalyst and the inert reaction solvent) may be carried out under stirring or agitation by using any suitable methodology (e.g., magnetic stirring, mechanical stirring, a rotated reaction vessel having internal mixing structures, etc.). In an embodiment, the humus material, the catalyst and the inert reaction solvent are pre-mixed and heated prior to the addition of the alkoxylating agent to form the reaction mixture. When any of the components of the reaction mixture are pre-mixed, such pre-mixing generally occurs at the temperature at which it is intended to carry out the chemical modification of the humus materials (e.g., alkoxylation of humus materials), e.g., a temperature ranging from about 130° C. to about 170° C. In an embodiment, when a component of the reaction mixture is added to pre-mixed components, such addition may occur by adding all at once the entire amount of the component to the pre-mixed components. In an alternative embodiment, the component may be added in different portions/aliquots/charges to the pre-mixed components over a desired time period. For example, the total amount of the alkoxylating agent (e.g., ethylene oxide and/or C3+ cyclic ether) may be divided into a plurality of portions, which may either have equal weights or have weights different from each other, and each portion of the alkoxylating agent (e.g., ethylene oxide and/or C3+ cyclic ether) may be added to the pre-mixed components (e.g., the pre-mixed humus material, catalyst and inert reaction solvent) over a desired time period, such as for example each portion of the alkoxylating agent (e.g., ethylene oxide and/or C3+ cyclic ether) may be added to the pre-mixed components every hour. In an embodiment, when the alkoxylating agent (e.g., ethylene oxide and/or C3+ cyclic ether) is added to the other pre-mixed components in portions, the conditions (e.g., temperature, pressure) inside the reaction vessel where the chemical modification of the humus materials (e.g., alkoxylation of humus materials) is carried out might vary while each of the alkoxylating agent (e.g., ethylene oxide and/or C3+ cyclic ether) portions reacts with the humus material (e.g., alkoxylates the humus material). In such embodiment, the following portion of the alkoxylating agent (e.g., ethylene oxide and/or C3+ cyclic ether) may be added to the reaction vessel after the conditions (e.g., temperature, pressure) inside the reaction vessel have equilibrated (e.g., have reached a steady state, which may be the same or different when compared to the steady state conditions inside the reaction vessel prior to the addition of the previous portion of the alkoxylating agent).

In an embodiment, the reaction mixture or any pre-mixed components thereof may be heated in a substantially oxygen-free atmosphere to carry out the chemical modification of the humus materials, e.g., alkoxylation of humus materials. In an embodiment, the components of the reaction mixture (e.g., the humus material, the alkoxylating agent, the catalyst and the inert reaction solvent) may be mixed or pre-mixed in a substantially oxygen-free atmosphere. In an embodiment, the humus material, the catalyst and the inert reaction solvent are pre-mixed and heated in a substantially oxygen-free atmosphere prior to the addition of the alkoxylating agent (e.g., ethylene oxide and/or C3+ cyclic ether).

In an embodiment, the components of the reaction mixture (e.g., the humus material, alkoxylating agent, the catalyst and the inert reaction solvent) may be mixed or pre-mixed as previously described herein at a pressure at which it is intended to carry out the chemical modification reaction (e.g., alkoxylation of humus materials), e.g., a pressure in the range of from about 32 psi to about 300 psi, alternatively from about 25 psi to 250 psi, or alternatively from about 20 psi to 200 psi.

In an embodiment, the chemical modification reaction (e.g., alkoxylation of humus materials) may be carried out over a time period ranging from about 0.5 h to about 10 h, alternatively from about 0.5 h to about 7 h, or alternatively from about 0.5 h to about 3 h. In an embodiment, when any of the components of the reaction mixture (e.g., the humus material, the alkoxylating agent, the catalyst and the inert reaction solvent) are pre-mixed, such pre-mixing may occur for a time period ranging from about 0.5 h to about 1.5 h, or alternatively from about 0.5 h to about 1 h.

In an embodiment, the AHM (e.g., EHM and/or CAHM) may be recovered from the reaction mixture at the end of the alkoxylation reaction. The reaction may be terminated by removing the heat source and returning (e.g., cooling down) the reaction mixture to a temperature lower than the temperature required for the alkoxylation reaction, e.g., a temperature lower than about 130° C. The reaction mixture may be filtered to remove any solid particulates that might still be present in the reaction mixture.

In an embodiment, the inert reaction solvent may be removed from the reaction mixture at the end of the alkoxylation reaction by using any suitable methodology, such as for example flash evaporation, distillation, liquid-liquid-extraction, or combinations thereof. The removal of the inert reaction solvent may generally yield AHMs (e.g., recovered AHMs). Depending on the degree of alkoxylation of the AHMs (e.g., the extent of the chemical modification of the humus materials), the state of matter of the recovered AHMs may range from a liquid to a solid. As will be appreciated by one of ordinary skill in the art, and with the help of this disclosure, the degree of alkoxylation of the AHMs (e.g., the extent of the chemical modification of the humus materials) is dependent on the ratio of the alkoxylating agent to the humus material in the reaction mixture.

In an embodiment, the AHM obtained as previously described herein by using a strong base catalyst comprises a compound characterized by Structure VII:

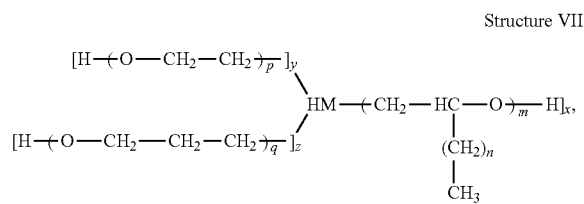

Structure VII where HM represents the humus material; the repeating methylene (—CH$_2$—) unit may occur n times with the value of n ranging from about 0 to about 3, alternatively from about 0 to about 2, or alternatively from about 0 to about 1, as previously described for the C3+ cyclic ether (e.g., C3+ epoxide) compound characterized by Structure III; a repeating C3+ cyclic ether unit or C3+ epoxide unit that originates from the C3+ cyclic ether (e.g., C3+ epoxide) in the presence of a strong base catalyst may occur m times with the value of m ranging from about 1 to about 30, alternatively from about 2 to about 20, or alternatively from about 2 to about 10; a C3+ alkoxylating element may occur x times with the value of x ranging from about 0 to about 300, alternatively from about 2 to about 250, or alternatively from about 10 to about 200, per 100 g of humus material; a repeating ethoxy unit may occur p times with the value of p ranging from about 1 to about 30, alternatively from about 2 to about 20, or alternatively from about 2 to about 10; an ethoxylating element may occur y times with the value of y ranging from about 0 to about 200, alternatively from about 1 to about 150, or alternatively from about 2 to about 100, per 100 g of humus material; a repeating oxetane unit (e.g., when the C3+ cyclic ether used in the alkoxylation comprises oxetane as characterized by Structure II) may occur q times with the value of q ranging from about 1 to about 30, alternatively from about 2 to about 20, or alternatively from about 2 to about 10; and a C3+ alkoxylating element may occur z times with the value of z ranging from about 0 to about 300, alternatively from about 1 to about 250, or alternatively from about 2 to about 200, per 100 g of humus material. As will be appreciated by one of skill in the art, and with the help of this disclosure, x, y and z cannot all be 0 at the same time. For purposes of the disclosure herein, one or more alkoxy or alkoxylating units (e.g., a C3+ cyclic ether unit, a C3+ epoxide unit, an oxetane unit, an ethoxy unit) that attach to the humus material structure in the same point (e.g., via the same functional group of the humus material) will be referred to herein as an "alkoxyating element" (e.g., "C3+ alkoxylating element," "ethoxylating element"). The C3+ alkoxylating element refers to an alkoxyating element that originates from a C3+ cyclic ether, such as for example oxetane, a C3+ epoxide, etc. For purposes of the disclosure herein, the description of various substituents (e.g., a substituent of an AHM, such as for example a C3+ alkoxylating element, an ethoxylating element, etc.) and parameters thereof (e.g., x, x1, y, z, p, q, m, m1) is understood to apply to all related structures, unless otherwise designated herein.

In an embodiment, the AHM (e.g., EHM and/or CAHM) obtained as previously described herein by using a strong acid catalyst comprises a compound characterized by Structure VIII:

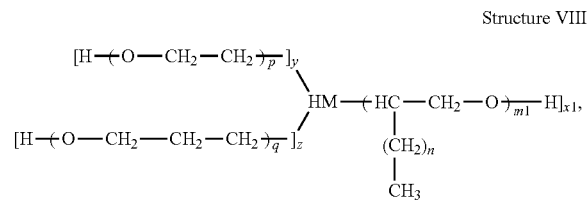

Structure VIII where the repeating C3+ cyclic ether unit that originates from the C3+ cyclic ether in the presence of a strong acid catalyst may occur m1 times with the value of m1 ranging from about 1 to about 30, alternatively from about 2 to about 20, or alternatively from about 2 to about 10; and the C3+ alkoxylating element may occur x1 times with the value of x1 ranging from about 0 to about 300, alternatively from about 2 to about 250, or alternatively from about 10 to about 200, per 100 g of humus material. As will be appreciated by one of skill in the art, and with the help of this disclosure, x1, y and z cannot all be 0 at the same time.

Without wishing to be limited by theory, the functional groups of the humus material may act as the nucleophile in the alkoxylation reaction in the presence of a strong base, thereby attacking the C3+ cyclic ether ring (e.g., the cyclic ether ring of the compound characterized by Structure III) at the least substituted carbon atom. Further, without wishing to be limited by theory, it is expected that the alkoxylation reaction between the humus material and the C3+ cyclic ether in the presence of a strong base will yield the compound characterized by Structure VII, due both to the presence of the strong base catalyst and to major steric hinderance between the very bulky humus material and the alkyl chain (e.g., $(CH_2)_nCH_3$) present in the C3+ cyclic ether compound characterized by Structure III. While unlikely, it might be possible that a small amount of a compound characterized by Structure VIII would form during the alkoxylation of the humus material in the presence of a strong base.

In an embodiment, the AHMs obtained as previously described herein by using a strong base catalyst may comprise a compound characterized by Structure VIII in an amount of less than about 10 wt. %, alternatively less than about 9 wt. %, alternatively less than about 8 wt. %, alternatively less than about 7 wt. %, alternatively less than about 6 wt. %, alternatively less than about 5 wt. %, alternatively less than about 4 wt. %, alternatively less than about 3 wt. %, alternatively less than about 2 wt. %, alternatively less than about 1 wt. %, alternatively less than about 0.1 wt. %, alternatively less than about 0.01 wt. %, alternatively less than about 0.001 wt. %, alternatively less than about 0.0001 wt. %, based on the total weight of the AHM.

Without wishing to be limited by theory, in the presence of a strong acid catalyst, the C3+ cyclic ether ring deprotonates the strong acid, thereby creating a protonated C3+ cyclic ether ring intermediate having a positive charge that is delocalized between the O atom of the cyclic ether ring and the most substituted carbon atom adjacent to the O atom of the cyclic ether ring, thereby enabling the functional groups of the humus material to act as the nucleophile in the alkoxylation reaction, and attack the C3+ cyclic ether ring (e.g., the cyclic ether ring of the compound characterized by Structure III) at the most substituted carbon atom. Further, without wishing to be limited by theory, it is expected that the alkoxylation reaction between the humus material and the C3+ cyclic ether in the presence of a strong acid will yield the compound characterized by Structure VIII, due to the presence of the strong acid catalyst. While unlikely, it might be possible that a small amount of a compound characterized by Structure VII would form during the alkoxylation of the humus material in the presence of a strong acid.

In an embodiment, the AHMs obtained as previously described herein by using a strong acid catalyst may comprise a compound characterized by Structure VII in an amount of less than about 10 wt. %, alternatively less than about 9 wt. %, alternatively less than about 8 wt. %, alternatively less than about 7 wt. %, alternatively less than about 6 wt. %, alternatively less than about 5 wt. %, alternatively less than about 4 wt. %, alternatively less than about 3 wt. %, alternatively less than about 2 wt. %, alternatively less than about 1 wt. %, alternatively less than about 0.1 wt. %, alternatively less than about 0.01 wt. %, alternatively less than about 0.001 wt. %, alternatively less than about 0.0001 wt. %, based on the total weight of the AHM.

As will be appreciated by one of skill in the art, and with the help of this disclosure, an AHM obtained by using a strong acid catalyst may be combined with an AHM obtained by using a strong base catalyst, as it may be desirable to modulate the properties (e.g., solubility, melting point, thermal stability, etc.) of the AHM to be used in further applications.

In an embodiment, the AHM comprises a multi-branched structure, wherein each branch comprises repeating alkoxy units, such as for example repeating C3+ cyclic ether units (e.g., C3+ epoxide unit, oxetane unit) and/or repeating ethoxy units, as shown in Structure VII and/or Structure VIII. For example, each branch of the AHM is represented in Structure VII by each of the x C3+ alkoxylating elements, by each of the y ethoxylating elements, or by each of the z C3+ alkoxylating elements. For example, each branch of the AHM is represented in Structure VIII by each of the x1 C3+ alkoxylating elements, by each of the y ethoxylating elements, or by each of the z C3+ alkoxylating elements. In an embodiment, the branch of an AHM may comprise a C3+ alkoxylating element of Structure VII, an ethoxylating element, or combinations thereof. In an embodiment, the branch of an AHM may comprise a C3+ alkoxylating element of Structure VIII, an ethoxylating element, or combinations thereof.

In an embodiment, an AHM obtained by using a strong base catalyst may comprise a repeating C3+ cyclic ether unit (e.g., C3+ epoxide unit) as shown in Structure VIII in an amount of less than about 10 wt. %, alternatively less than about 9 wt. %, alternatively less than about 8 wt. %, alternatively less than about 7 wt. %, alternatively less than about 6 wt. %, alternatively less than about 5 wt. %, alternatively less than about 4 wt. %, alternatively less than about 3 wt. %, alternatively less than about 2 wt. %, alternatively less than about 1 wt. %, alternatively less than about 0.1 wt. %, alternatively less than about 0.01 wt. %, alternatively less than about 0.001 wt. %, alternatively less than about 0.0001 wt. %, based on the total weight of the AHM obtained by using a strong base catalyst.

In an embodiment, an AHM obtained by using a strong acid catalyst may comprise a repeating C3+ cyclic ether unit (e.g., C3+ epoxide unit) as shown in Structure VII in an amount of less than about 10 wt. %, alternatively less than about 9 wt. %, alternatively less than about 8 wt. %, alternatively less than about 7 wt. %, alternatively less than about 6 wt. %, alternatively less than about 5 wt. %, alternatively less than about 4 wt. %, alternatively less than about 3 wt. %, alternatively less than about 2 wt. %, alternatively less than about 1 wt. %, alternatively less than about 0.1 wt. %, alternatively less than about 0.01 wt. %, alternatively less than about 0.001 wt. %, alternatively less than about 0.0001 wt. %, based on the total weight of the AHM obtained by using a strong acid catalyst.

As will be apparent to one of skill in the art, and with the help of this disclosure, each of the x C3+ alkoxylating elements and/or C3+ alkoxylating branches of Structure VII may independently comprise lengths (e.g., numbers (m) of cyclic ether units) that may be the same or different when compared to the lengths (e.g., numbers (m) of cyclic ether units) of the other C3+ alkoxylating elements (e.g., C3+ alkoxylating branches). For example, one or more of the C3+ alkoxylating elements (e.g., C3+ alkoxylating branches) of Structure VII may comprise m=5 C3+ cyclic ether units; one or more of the C3+ alkoxylating elements (e.g., C3+ alkoxylating branches) may comprise m=4 C3+ cyclic ether units; one or more of the C3+ alkoxylating elements (e.g., C3+ alkoxylating branches) may comprise m=8 C3+ cyclic ether units; etc. Similarly, when oxetane as characterized by Structure II is used in the alkoxylation reaction, each of the z C3+ alkoxylating elements and/or C3+ alkoxylating branches of Structure VII and/or Structure VIII may independently comprise lengths (e.g., numbers (q) of oxetane units) that may be the same or different when compared to the lengths (e.g., numbers (q) of oxetane units) of the other C3+ alkoxylating elements (e.g., C3+ alkoxylating branches). For example, one or more of the z C3+ alkoxylating elements (e.g., C3+ alkoxylating branches) of Structure VII and/or Structure VIII may comprise q=5 oxetane units; one or more of the z C3+ alkoxylating elements (e.g., C3+ alkoxylating branches) may comprise q=4 oxetane units; one or more of the z C3+ alkoxylating elements (e.g., C3+ alkoxylating branches) may comprise q=8 oxetane units; etc. Similarly, when ethylene oxide is used in the alkoxylation reaction along with the C3+ cyclic ether (e.g., y≠0), each of the y ethoxylating elements and/or ethoxylating branches of Structure VII and/or Structure VIII may independently comprise lengths (e.g., numbers (p) of ethoxy units) that may be the same or different when compared to the lengths (e.g., numbers (p) of ethoxy units) of the other ethoxylating elements (e.g., ethoxylating branches). For example, one or more of the ethoxylating elements (e.g., ethoxylating branches) of Structure VII and/or Structure VIII may comprise p=5 ethoxy units; one or more of the ethoxylating elements (e.g., ethoxylating branches) may comprise p=4 ethoxy units; one or more of the ethoxylating elements (e.g., ethoxylating branches) may comprise p=8 ethoxy units; etc.

As will be apparent to one of ordinary skill in the art, and with the help of this disclosure, more than one type of C3+ cyclic ether may be used in the same alkoxylation reaction of the humus material, and as such one or more of the x C3+ alkoxylating elements (e.g., C3+ alkoxylating branches) of Structure VII and/or one or more of the x1 C3+ alkoxylating elements (e.g., C3+ alkoxylating branches) of Structure VIII may comprise different types of cyclic ether units (e.g., propylene oxide, butylene oxide, pentylene oxide, etc.). For example, some of the C3+ alkoxylating elements (e.g., C3+ alkoxylating branches) of Structure VII and/or Structure VIII may comprise only one type of cyclic ether unit (e.g., propylene oxide); other C3+ alkoxylating elements (e.g., C3+ alkoxylating branches) of Structure VII and/or Structure VIII may comprise only one type of a different type of cyclic ether unit (e.g., butylene oxide); other C3+ alkoxylating elements (e.g., C3+ alkoxylating branches) of Structure VII and/or Structure VIII may comprise only one type of another type of cyclic ether unit (e.g., oxetane); one or more of the C3+ alkoxylating elements (e.g., C3+ alkoxylating branches) of Structure VII and/or Structure VIII may comprise two types of cyclic ether units (e.g., propylene oxide and butylene oxide); one or more of the C3+ alkoxylating elements (e.g., C3+ alkoxylating branches) of Structure VII and/or Structure VIII may comprise three types of cyclic ether units (e.g., propylene oxide, butylene oxide, and oxetane); etc. Similarly, when ethylene oxide is used in the alkoxylation reaction along with the C3+ cyclic ether (e.g., y≠0), each of the alkoxylating elements (e.g., alkoxylating branches) of Structure VII and/or Structure VIII (e.g., C3+ alkoxylating element, ethoxylating element) may independently comprise both ethoxy units and C3+ cyclic ether units.

In an embodiment, when more than one type of alkoxylating agent (e.g., C3+ cyclic ether, propylene oxide, butylene oxide, pentylene oxide, oxetane, ethylene oxide, etc.) is used during the alkoxylation reaction of the humus material, all alkoxylating agents (e.g., C3+ cyclic ether, propylene oxide, butylene oxide, pentylene oxide, oxetane, ethylene oxide, etc.) may be added into the reaction vessel at the same time. In an alternative embodiment, the alkoxylating agents (e.g., C3+ cyclic ether, propylene oxide, butylene oxide, pentylene oxide, oxetane, ethylene oxide, etc.) may be added into the reaction vessel at different times. In some embodiments, the alkoxy units may form new alkoxylated elements/branches, or may extend already existing alkoxylated elements/branches. In yet other embodiments, the humus material may be alkoxylated with one type of alkoxylating agent (e.g., C3+ cyclic ether, propylene oxide, butylene oxide, pentylene oxide, oxetane, ethylene oxide, etc.) and then recovered as a first AHM, and the first AHM may be used as the humus material in a subsequent alkoxylation reaction with a different type of alkoxylating agent (e.g., C3+ cyclic ether, propylene oxide, butylene oxide, pentylene oxide, oxetane, ethylene oxide, etc.) and then recovered as a second AHM. In such embodiments, the second AHM may comprise alkoxylated elements/branches of the first AHM, alkoxylated elements/branches that were newly formed in the subsequent alkoxylation reaction, and alkoxylated elements/branches that were formed by adding alkoxy units to the alkoxylated elements/branches of the first AHM. As will be appreciated by one of skill in the art, and with the help of this disclosure, an AHM produced in the presence of a strong acid catalyst may be used as the humus material in a subsequent alkoxylation reaction that may take place in the presence of a strong base catalyst. Similarly, as will be appreciated by one of skill in the art, and with the help of this disclosure, an AHM produced in the presence of a strong base catalyst may be used as the humus material in a subsequent alkoxylation reaction that may take place in the presence of a strong acid catalyst.

In an embodiment, the structure of the compound characterized by Structure VII and/or the structure of the compound characterized by Structure VIII may be confirmed by running structure analysis tests. Nonlimiting examples of structure analysis tests suitable for use in the present disclosure include ash analysis for mineral content; elemental ash analysis; elemental analysis for C, H, O, N, S, which could also provide some information regarding the ratio of different alkoxy units in the AHM, such as for example the ratio of propylene oxide or propoxy units to ethoxy units in the AHM, in the case of an alkoxylation reaction where both propylene oxide and ethylene oxide are used; infrared or IR spectroscopy, which could provide information with respect to carboxylic groups differences between the humus material and the AHM, as well as identify the presence of different alkoxy units in the AHM, such as for example the propoxy units and ethoxy units in the AHM; ultraviolet-visible or UV-Vis spectroscopy which could provide information regarding the presence of alkoxy units in the AHM; nuclear magnetic resonance or NMR spectroscopy for AHMs soluble in $D_2O$ (i.e., deuterated water) and/or $CDCl_3$ (deuterated chloroform), to identify the presence of different alkoxy units in the AHM, such as for example the propoxy units and ethoxy units in the AHM, as well as their ratios with respect to each other; thermogravimetric analysis or TGA for investigating the AHM profile loss of weight versus temperature, i.e., AHM thermal stability; differential thermal analysis or DTA to record the exotherm thermograms or the endotherm thermograms; differential scanning calorimetry or DSC; gel permeation chromatography and low-angle laser light scattering to determine the MW of the AHMs; and the like.

In an embodiment, the reaction mixture excludes ethylene oxide. In an embodiment, the reaction mixture does not contain a material amount of ethylene oxide. In an embodiment, the reaction mixture comprises ethylene oxide in an amount of less than about 1 wt. %, alternatively less than about 0.1 wt. %, alternatively less than about 0.01 wt. %, alternatively less than about 0.001 wt. %, alternatively less than about 0.0001 wt. %, alternatively less than about 0.00001 wt. %, or alternatively less than about 0.000001 wt. %, based on the total weight of the reaction mixture. In such embodiment, referring to the AHM characterized by Structure VII and/or to the AHM characterized by Structure VIII, y=0. In such embodiment, the AHM characterized by Structure VII and/or the AHM characterized by Structure VIII comprises a CAHM. In such embodiment, the AHM characterized by Structure VII comprises a compound characterized by Structure IX (e.g., a CAHM), and/or the AHM characterized by Structure VIII comprises a compound characterized by Structure X (e.g., a CAHM):

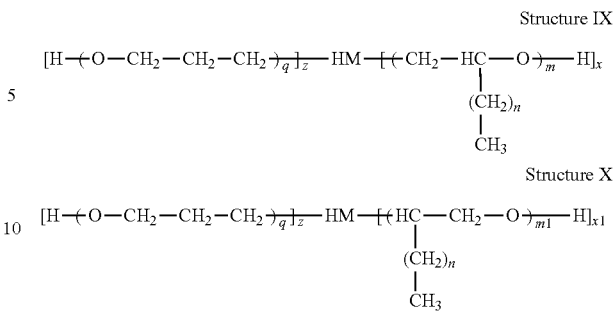

where HM represents the humus material; the repeating methylene ($-CH_2-$) unit may occur n times with the value of n ranging from about 0 to about 3, alternatively from about 0 to about 2, or alternatively from about 0 to about 1, as previously described for the C3+ cyclic ether compound characterized by Structure III; the repeating C3+ cyclic ether unit that originates from the C3+ cyclic ether (e.g., C3+ epoxide) in the presence of a strong base catalyst may occur m times with the value of m ranging from about 1 to about 30, alternatively from about 2 to about 20, or alternatively from about 2 to about 10; the repeating C3+ cyclic ether unit that originates from the C3+ cyclic ether (e.g., C3+ epoxide) in the presence of a strong acid catalyst may occur m1 times with the value of m1 ranging from about 1 to about 30, alternatively from about 2 to about 20, or alternatively from about 2 to about 10; the C3+ alkoxylating element may occur x times with the value of x ranging from about 0 to about 300, alternatively from about 2 to about 250, or alternatively from about 10 to about 200, per 100 g of humus material; the C3+ alkoxylating element may occur x1 times with the value of x1 ranging from about 0 to about 300, alternatively from about 2 to about 250, or alternatively from about 10 to about 200, per 100 g of humus material; the repeating oxetane unit (e.g., when the C3+ cyclic ether used in the alkoxylation comprises oxetane as characterized by Structure II) may occur q times with the value of q ranging from about 1 to about 30, alternatively from about 2 to about 20, or alternatively from about 2 to about 10; and the C3+ alkoxylating element may occur z times with the value of z ranging from about 0 to about 300, alternatively from about 1 to about 250, or alternatively from about 2 to about 200, per 100 g of humus material. As will be appreciated by one of skill in the art, and with the help of this disclosure, x and z cannot both be 0 at the same time. Similarly, as will be appreciated by one of skill in the art, and with the help of this disclosure, x1 and z cannot both be 0 at the same time.

In an embodiment, the CAHM characterized by Structure IX comprises a propoxylated humus material characterized by Structure XI, a propoxylated/butoxylated humus material characterized by Structure XII, a propoxylated/pentoxylated humus material characterized by Structure XIII, and the like, or combinations thereof. As will be appreciated by one of skill in the art, and with the help of this disclosure, the alkoxylation of a humus material with oxetane results in a propoxylated humus material. Further, as will be appreciated by one of skill in the art, and with the help of this disclosure, a propoxylated humus material may comprise oxetane units, propoxy units that originate in an alkoxylating agent comprising propylene oxide as characterized by Structure IV, or combinations thereof.

Structure XI

[H—(O—CH₂—CH₂—CH₂)$_q$]$_z$—HM—[(CH₂—CH—O)$_m$—H]$_x$
                                         |
                                        CH₃

Structure XII

[H—(O—CH₂—CH₂—CH₂)$_q$]$_z$—HM—[(CH₂—HC—O)$_m$—H]$_x$
                                         |
                                        CH₂
                                         |
                                        CH₃

Structure XIII

[H—(O—CH₂—CH₂—CH₂)$_q$]$_z$—HM—[(CH₂—HC—O)$_m$—H]$_x$
                                         |
                                       (CH₂)₂
                                         |
                                        CH₃

In an embodiment, the CAHM characterized by Structure X comprises a propoxylated humus material characterized by Structure XIV, a propoxylated/butoxylated humus material characterized by Structure XV, a propoxylated/pentoxylated humus material characterized by Structure XVI, and the like, or combinations thereof.

Structure XIV

[H—(O—CH₂—CH₂—CH₂)$_q$]$_z$—HM—[(CH—CH₂—O)$_{m1}$—H]$_{x1}$
                                    |
                                   CH₃

Structure XV

[H—(O—CH₂—CH₂—CH₂)$_q$]$_z$—HM—[(HC—CH₂—O)$_{m1}$—H]$_{x1}$
                                    |
                                   CH₂
                                    |
                                   CH₃

Structure XVI

[H—(O—CH₂—CH₂—CH₂)$_q$]$_z$—HM—[(HC—CH₂—O)$_{m1}$—H]$_{x1}$
                                    |
                                  (CH₂)₂
                                    |
                                   CH₃

In an embodiment, the reaction mixture excluding ethylene oxide further excludes oxetane as characterized by Structure II. In such embodiment, the reaction mixture does not contain a material amount of oxetane. In such embodiment, the reaction mixture comprises oxetane in an amount of less than about 1 wt. %, alternatively less than about 0.1 wt. %, alternatively less than about 0.01 wt. %, alternatively less than about 0.001 wt. %, alternatively less than about 0.0001 wt. %, alternatively less than about 0.00001 wt. %, or alternatively less than about 0.000001 wt. %, based on the total weight of the reaction mixture. In such embodiment, referring to the CAHM characterized by Structure IX and/or to the CAHM characterized by Structure X, z=0. In such embodiment, the CAHM characterized by Structure IX comprises a compound characterized by Structure XVII, and/or the CAHM characterized by Structure X comprises a compound characterized by Structure XVIII:

Structure XVII

HM—[(CH₂—HC—O)$_m$—H]$_x$
          |
        (CH₂)$_n$
          |
         CH₃

Structure XVIII

HM—[(HC—CH₂—O)$_{m1}$—H]$_{x1}$
        |
      (CH₂)$_n$
        |
       CH₃ where HM represents the humus material; the repeating methylene (—CH₂—) unit may occur n times with the value of n ranging from about 0 to about 3, alternatively from about 0 to about 2, or alternatively from about 0 to about 1, as previously described for the C3+ cyclic ether compound characterized by Structure III; the repeating C3+ cyclic ether unit that originates from the C3+ cyclic ether in the presence of a strong base catalyst may occur m times with the value of m ranging from about 1 to about 30, alternatively from about 2 to about 20, or alternatively from about 2 to about 10; the repeating C3+ cyclic ether unit that originates from the C3+ cyclic ether (e.g., C3+ epoxide) in the presence of a strong acid catalyst may occur m1 times with the value of m1 ranging from about 1 to about 30, alternatively from about 2 to about 20, or alternatively from about 2 to about 10; the C3+ alkoxylating element may occur x times with the value of x ranging from about 1 to about 300, alternatively from about 2 to about 250, or alternatively from about 10 to about 200, per 100 g of humus material; the C3+ alkoxylating element may occur x1 times with the value of x1 ranging from about 1 to about 300, alternatively from about 2 to about 250, or alternatively from about 10 to about 200, per 100 g of humus material.

In an embodiment, the CAHM characterized by Structure XVII comprises a propoxylated humus material characterized by Structure XIX, a butoxylated humus material characterized by Structure XX, a pentoxylated humus material characterized by Structure XXI, and the like, or combinations thereof.

Structure XIX

HM—[(CH₂—HC—O)$_m$—H]$_x$
          |
         CH₃

Structure XX

HM—[(CH₂—HC—O)$_m$—H]$_x$
          |
         CH₂
          |
         CH₃

Structure XXI

HM—[(CH₂—HC—O)$_m$—H]$_x$
          |
        (CH₂)₂
          |
         CH₃

In an embodiment, the CAHM characterized by Structure XVIII comprises a propoxylated humus material characterized by Structure XXII, a butoxylated humus material characterized by Structure XXIII, a pentoxylated humus material characterized by Structure XXIV, and the like, or combinations thereof.

Structure XXII

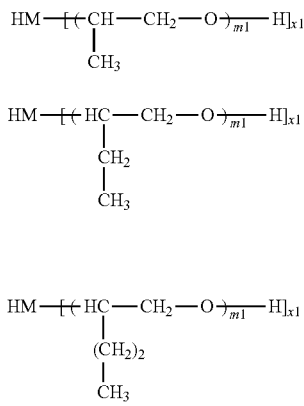

Structure XXIII

Structure XXIV

In an embodiment, the reaction mixture excluding ethylene oxide further excludes an epoxide (e.g., C3+ epoxide) compound characterized by Structure III. In such embodiment, the reaction mixture does not contain a material amount of an epoxide (e.g., C3+ epoxide) compound characterized by Structure III. In such embodiment, the reaction mixture comprises an epoxide (e.g., C3+ epoxide) compound characterized by Structure III in an amount of less than about 1 wt. %, alternatively less than about 0.1 wt. %, alternatively less than about 0.01 wt. %, alternatively less than about 0.001 wt. %, alternatively less than about 0.0001 wt. %, alternatively less than about 0.00001 wt. %, or alternatively less than about 0.000001 wt. %, based on the total weight of the reaction mixture. In such embodiment, referring to the CAHM characterized by Structure IX, x=0. In such embodiment, referring to the CAHM characterized by Structure X, x1=0. In such embodiment, the CAHM characterized by Structure IX and/or the CAHM characterized by Structure X comprise a propoxylated humus material characterized by Structure XXV:

Structure XXV

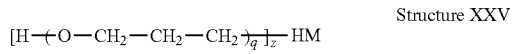

where HM represents the humus material; the repeating oxetane unit (e.g., when the C3+ cyclic ether used in the alkoxylation comprises oxetane as characterized by Structure II) may occur q times with the value of q ranging from about 1 to about 30, alternatively from about 2 to about 20, or alternatively from about 2 to about 10; and the C3+ alkoxylating element may occur z times with the value of z ranging from about 1 to about 300, alternatively from about 1 to about 250, or alternatively from about 2 to about 200, per 100 g of humus material.

In an embodiment, the reaction mixture comprises a strong base catalyst and ethylene oxide along with the C3+ cyclic ether, as previously described herein. In such embodiment, the AHM characterized by Structure VII comprises a propoxylated/ethoxylated humus material characterized by Structure XXVI, a butoxylated/propoxylated/ethoxylated humus material characterized by Structure XXVII, a pentoxylated/propoxylated/ethoxylated humus material characterized by Structure XXVIII, and the like, or combinations thereof.

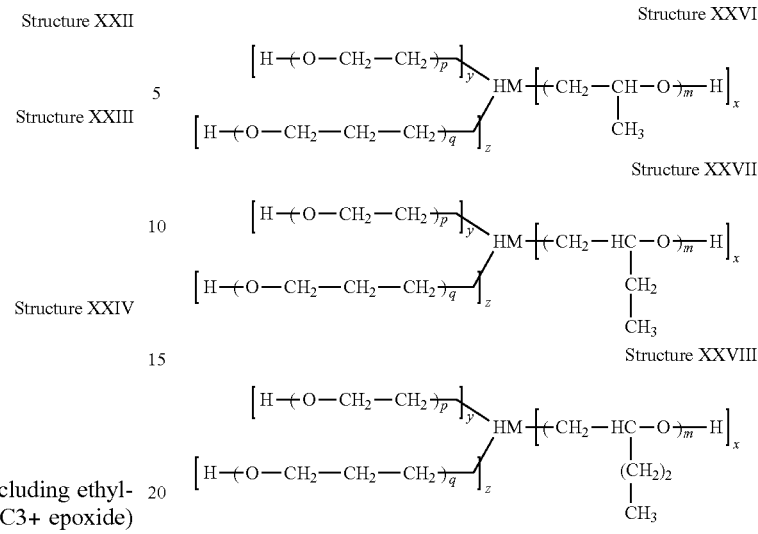

In an embodiment, the reaction mixture comprises a strong acid catalyst and ethylene oxide along with the C3+ cyclic ether, as previously described herein. In such embodiment, the AHM characterized by Structure VIII comprises a propoxylated/ethoxylated humus material characterized by Structure XXIX, a butoxylated/propoxylated/ethoxylated humus material characterized by Structure XXX, a pentoxylated/propoxylated/ethoxylated humus material characterized by Structure XXXI, and the like, or combinations thereof.

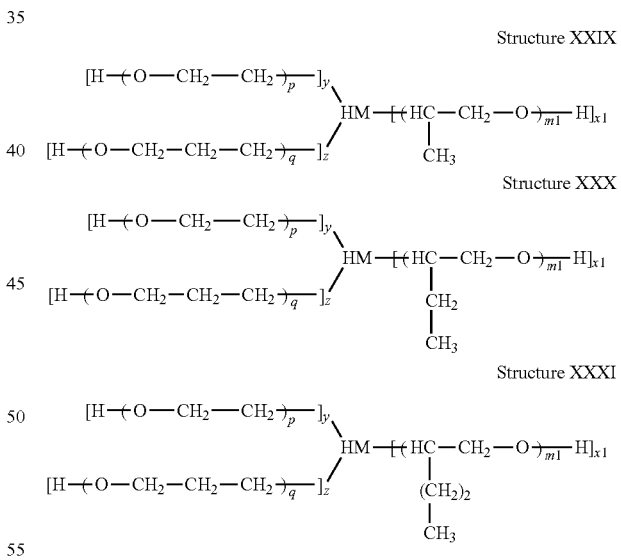

In an embodiment, the reaction mixture excludes oxetane. In an embodiment, the reaction mixture does not contain a material amount of oxetane. In an embodiment, the reaction mixture comprises oxetane in an amount of less than about 1 wt. %, alternatively less than about 0.1 wt. %, alternatively less than about 0.01 wt. %, alternatively less than about 0.001 wt. %, alternatively less than about 0.0001 wt. %, alternatively less than about 0.00001 wt. %, or alternatively less than about 0.000001 wt. %, based on the total weight of the reaction mixture. In such embodiment, referring to the AHM characterized by Structure VII and/or to the AHM characterized by Structure VIII, z=0. In such embodiment, the AHM characterized by Structure VII comprises a compound characterized by Structure XXXII (e.g., a CAHM), and/or the AHM characterized by Structure VIII comprises a compound characterized by Structure XXXIII (e.g., a CAHM):

Structure XXXII
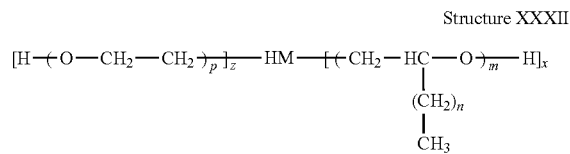

Structure XXXIII
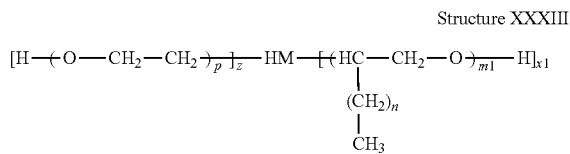

where HM represents the humus material; the repeating methylene (—CH$_2$—) unit may occur n times with the value of n ranging from about 0 to about 3, alternatively from about 0 to about 2, or alternatively from about 0 to about 1, as previously described for the C3+ cyclic ether compound characterized by Structure III; the repeating C3+ cyclic ether unit that originates from the C3+ cyclic ether in the presence of a strong base catalyst may occur m times with the value of m ranging from about 1 to about 30, alternatively from about 2 to about 20, or alternatively from about 2 to about 10; the repeating C3+ cyclic ether unit that originates from the C3+ cyclic ether (e.g., C3+ epoxide) in the presence of a strong acid catalyst may occur m1 times with the value of m1 ranging from about 1 to about 30, alternatively from about 2 to about 20, or alternatively from about 2 to about 10; the C3+ alkoxylating element may occur x times with the value of x ranging from about 1 to about 300, alternatively from about 2 to about 250, or alternatively from about 10 to about 200, per 100 g of humus material; the C3+ alkoxylating element may occur x1 times with the value of x1 ranging from about 1 to about 300, alternatively from about 2 to about 250, or alternatively from about 10 to about 200, per 100 g of humus material; the repeating ethoxy unit (e.g., when ethylene oxide is used in the alkoxylation along with the C3+ cyclic ether) may occur p times with the value of p ranging from about 1 to about 30, alternatively from about 2 to about 20, or alternatively from about 2 to about 10; and the ethoxylating element may occur y times with the value of y ranging from about 1 to about 200, alternatively from about 1 to about 150, or alternatively from about 2 to about 100, per 100 g of humus material.

In an embodiment, the reaction mixture comprises a strong base catalyst and ethylene oxide along with the C3+ cyclic ether, as previously described herein. In such embodiment, the CAHM characterized by Structure XXXII comprises a propoxylated/ethoxylated humus material characterized by Structure XXXIV, a butoxylated/ethoxylated humus material characterized by Structure XXXV, a pentoxylated/ethoxylated humus material characterized by Structure XXXVI, and the like, or combinations thereof.

Structure XXXIV
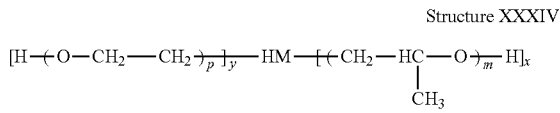

Structure XXXV
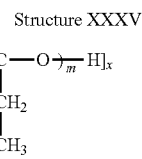

Structure XXXVI
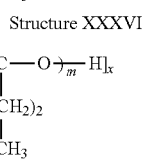

In an embodiment, the reaction mixture comprises a strong acid catalyst and ethylene oxide along with the C3+ cyclic ether, as previously described herein. In such embodiment, the CAHM characterized by Structure XXXIII comprises a propoxylated/ethoxylated humus material characterized by Structure XXXVII, a butoxylated/ethoxylated humus material characterized by Structure XXXVIII, a pentoxylated/ethoxylated humus material characterized by Structure XXXIX, and the like, or combinations thereof.

Structure XXXVII
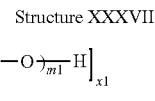

Structure XXXVIII
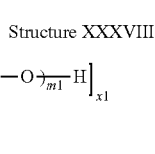

Structure XXXIX
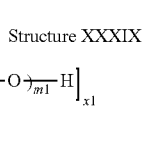

In an embodiment, the reaction mixture excluding oxetane further excludes an epoxide (e.g., C3+ epoxide) compound characterized by Structure III. In such embodiment, the reaction mixture does not contain a material amount of an epoxide (e.g., C3+ epoxide) compound characterized by Structure III. In such embodiment, the reaction mixture comprises an epoxide (e.g., C3+ epoxide) compound characterized by Structure III in an amount of less than about 1 wt. %, alternatively less than about 0.1 wt. %, alternatively less than about 0.01 wt. %, alternatively less than about 0.001 wt. %, alternatively less than about 0.0001 wt. %, alternatively less than about 0.00001 wt. %, or alternatively less than about 0.000001 wt. %, based on the total weight of the reaction mixture. In such embodiment, referring to the AHM characterized by Structure VII and/or to the AHM characterized by Structure VIII, x=0 and z=0. In such embodiment, the AHM characterized by Structure VII and/or the AHM characterized by Structure VIII comprises an EHM. In an embodiment, the EHM comprises a compound characterized by Structure XL:

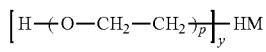

Structure XL where HM represents the humus material; the repeating ethoxy unit may occur p times with the value of p ranging from about 1 to about 30, alternatively from about 2 to about 20, or alternatively from about 2 to about 10; and the ethoxylating element may occur y times with the value of y ranging from about 1 to about 200, alternatively from about 1 to about 150, or alternatively from about 2 to about 100, per 100 g of humus material.

In an embodiment, the AHMs may be a liquid when the weight ratio of alkoxylating agent to humus material ranges from about 2:1 to about 15:1. In another embodiment, the AHMs may be a greasy wax when the weight ratio of alkoxylating agent to humus material is from about 15:1 to about 20:1. In yet another embodiment, the AHMs may be a waxy solid when the weight ratio of alkoxylating agent to humus material is from about 20:1 to about 30:1. In still yet another embodiment, the AHMs may be a solid when the weight ratio of alkoxylating agent to humus material ranges from about 30:1 to about 50:1.

Generally, the AHMs may be soluble in polar solvents such as water and methanol and insoluble in alkanes, hexane, pentane, and the like. Without wishing to be limited by theory, the higher the degree of alkoxylation of the AHMs (e.g., the extent of the chemical modification of the humus materials), the higher the solubility of the AHMs in polar solvents. The AHMs may also be soluble to some extent (e.g., slightly soluble) in aromatic hydrocarbons, and temperatures above the ambient temperature increase the solubility of AHMs in aromatic hydrocarbons. In an embodiment, the liquid AHMs may be slightly soluble in water and xylene. In an embodiment, the greasy wax AHMs may be slightly soluble in dimethyl formamide, and soluble in water and xylene. In an embodiment, the waxy solid AHMs may be soluble in dimethyl formamide and xylene, and very soluble in water. In an embodiment, the solid AHMs may be very soluble in dimethyl formamide, xylene, and water. For the purposes of the disclosure herein, "insoluble" refers to a solubility of less than 1.0 g/L in a particular solvent; "slightly soluble" refers to a solubility of from about 1.0 g/L to about 2.0 g/L in a particular solvent; "soluble" refers to a solubility of from about 2.0 g/L to about 20.0 g/L in a particular solvent; and "very soluble" refers to a solubility of equal to or greater than about 20.0 g/L in a particular solvent; wherein all solubility values are given at room temperature, unless otherwise noted.

In an embodiment, the AHM may act as an emulsifier for a bitumen-in-water emulsion. Generally, an emulsifier is a compound that aids in the forming of an emulsion (i.e., a mixture of two or more liquids that are normally immiscible) by decreasing the interfacial tension between immiscible liquids (e.g., bitumen and water); or a compound that stabilizes an already existing emulsion by decreasing the separation tendency of the liquids; or both. The immiscible liquids form a continuous phase and a discontinuous phase, wherein the discontinuous phase is dispersed in the form of droplets throughout the continuous phase. An emulsion or an oil-in-water emulsion (e.g., a bitumen-in-water emulsion) comprises oil (e.g., bitumen) as the discontinuous phase, and water as the continuous phase, wherein the discontinuous phase oil droplets (e.g., bitumen droplets) are dispersed throughout the continuous phase (e.g., water). An emulsifier can stabilize an emulsion (e.g., decrease the interfacial tension between the immiscible liquids) by surrounding the discontinuous phase droplets (e.g., oil droplets, bitumen droplets) and thereby preventing the aggregation of such droplets over a defined time period. An effective emulsifier has to have a certain degree of solubility in each of the immiscible liquids in order to be effective as an emulsifier for said immiscible liquids. As will be appreciated by one of skill in the art, and with the help of this disclosure, the type emulsion that forms (e.g., water-in-oil emulsion or oil-in-water emulsion) does not depend on the amounts of immiscible liquids used, but rather on the type (e.g., physical and chemical properties) of the immiscible liquids and on the type of emulsifier used. For example, an emulsifier that is more soluble in water than in oil will generally stabilize oil-in-water emulsions, while an emulsifier that is more soluble in oil than in water will generally stabilize water-in-oil emulsions.

In an embodiment, the AHM may be characterized by a hydrophilic-lipophilic balance (HLB) in the range of from about 11 to about 20, alternatively from about 11 to about 18, or alternatively from about 12 to about 16. HLB is a measure of the degree to which a compound (e.g., AHM) is hydrophilic or lipophilic, and indicates the ability of a compound (e.g., AHM) to stabilize an emulsion. HLB is generally expressed on a scale from 0 to 20, where HLB values lower than about 10 indicate water insoluble compounds (e.g., compounds with an elevated number of hydrophobic components), and HLB values higher than about 10 indicate water soluble compounds (e.g., compounds with an elevated number of hydrophilic components). The more hydrophilic components (e.g., alkoxylating elements) are present in a compound (e.g., AHM), the higher the HLB value for that compound. The higher the ratio of alkoxylating agent to humus material in the reaction mixture, the higher the HLB value for the AHM. HLB values over 10 for a compound (e.g., AHM) indicate that such compound (e.g., AHM) might have the ability to stabilize oil-in-water emulsions. According to Bancroft's rule, an emulsifier capable of stabilizing an oil-in-water emulsion has to be more soluble in water than in oil, which corresponds to HLB values above about 10.

Without wishing to be limited by theory, the AHMs comprise both hydrophilic components (e.g., alkoxylating elements) and hydrophobic components (e.g., humus materials), and the HLB of the AHMs (i.e., the ratio between the hydrophilic components and the hydrophobic components) can be modulated by varying the ratio between the humus material and the alkoxylating agent during the alkoxylation reaction. In an embodiment, a weight ratio of alkoxylating agent to humus material from about 2:1 to about 50:1 may lead to an AHM comprising an HLB in the range of from about 11 to about 20; alternatively, a weight ratio of alkoxylating agent to humus material from about 2:1 to about 47:1 may lead to an AHM comprising an HLB in the range of from about 11 to about 18; or alternatively, a weight ratio of alkoxylating agent to humus material from about 5:1 to about 45:1 may lead to an AHM comprising an HLB in the range of from about 12 to about 16.

In an embodiment, the AHM is present within the SBWE in an amount of from about 0.1 vol. % to about 2 vol. %, alternatively from about 0.1 vol. % to about 1 vol. %, alternatively from about 0.1 vol. % to about 0.5 vol. %, or alternatively from about 0.2 vol. % to about 0.3 vol. %, based on the total volume of the SBWE. In an embodiment, the AHM is present within the SBWE in an amount of about 0.2 vol. %, based on the total volume of the SBWE.

The SBWE may further comprise additional additives as deemed appropriate for improving the properties of the SBWE. Such additives may vary depending on the intended use of the SBWE. These additives may be introduced singularly or in combination using any suitable methodology and in amounts effective to produce the desired improvements in the properties of the SBWE. As will appreciated by one of skill in the art with the help of this disclosure, any of the components and/or additives used in the SBWE have to be compatible with the other components of the SBWE. In an embodiment, the SBWE may optionally comprise a corrosion inhibitor, an acid gas scavenger, a $H_2S$ scavenger, or combinations thereof. A nonlimiting example of such additive includes magnesium nitrate ($Mg(NO_3)_2$), which may be added to the SBWE as an inhibitor of high-temperature corrosion.

In an embodiment, the SBWE comprises bitumen, an EHM and water. For example, the SBWE may comprise 70 vol. % bitumen, 0.5 vol. % ethoxylated CARBONOX filtration control agent, and the balance comprises fresh water, based on the total volume of the SBWE. In such embodiment, the bitumen is extracted in the Orinoco Oil Belt, and the SBWE is similar to an ORIMULSION, wherein the ethoxylated CARBONOX filtration control agent replaces an emulsifier (e.g., alcohol ethoxylate and/or ethanolamine) commonly used for stabilizing the ORIMULSION. ORIMULSION is a fuel (e.g., an oil-in-water emulsion containing approximately 70% bitumen from the Orinoco region of Venezuela) manufactured by PDVSA-BITOR.

In an alternative embodiment, the SBWE comprises bitumen, a CAHM and water. For example, the SBWE may comprise 70 vol. % bitumen, 0.5 vol. % propoxylated lignite, and the balance comprises fresh water, based on the total volume of the SBWE. In such embodiment, the propoxylated lignite is characterized by Structure XIX, wherein the humus material is lignite; the value of m is about 25; the value of x is about 1; and the bitumen is extracted in the Orinoco Oil Belt, rendering the SBWE similar to an ORIMULSION, wherein the propoxylated lignite replaces the emulsifier (e.g., alcohol ethoxylate and/or ethanolamine) commonly used for stabilizing the ORIMULSION.

In yet another embodiment, the SBWE comprises bitumen, an AHM and water. For example, the SBWE may comprise 70 vol. % bitumen, 0.5 vol. % propoxylated/ethoxylated CARBONOX filtration control agent, and the balance comprises fresh water, based on the total volume of the SBWE. In such embodiment, the propoxylated/ethoxylated CARBONOX filtration control agent is characterized by Structure XXXIV, wherein the humus material is CARBONOX filtration control agent, the value of m is about 2, the value of x is about 15, the value of p is about 1.2, the value of y is about 10, and the bitumen is extracted in the Orinoco Oil Belt, rendering the SBWE similar to an ORIMULSION, wherein the propoxylated/ethoxylated CARBONOX filtration control agent replaces the emulsifier (e.g., alcohol ethoxylate and/or ethanolamine) commonly used for stabilizing the ORIMULSION.

In an embodiment, the SBWE comprising bitumen, water, and a sufficient amount of an AHM (e.g., an EHM and/or a CAHM) to form a stable emulsion may be prepared using any suitable method or process. The components of the SBWE (e.g., bitumen, water, AHM) may be combined and mixed in by using any mixing device compatible with the composition, e.g., a mixer, a blender, etc.

In an alternative embodiment, the bitumen and the water are mixed in a first step. In such embodiment, at least a portion of the water may be process water, as described previously herein. The bitumen-in-water emulsion may be prepared using any suitable method or process, for example by using any mixing device compatible with the composition, e.g., a mixer, a blender, etc. In such embodiment, the AHM is added to the bitumen-in-water emulsion in a second step, and the AHM and the bitumen-in-water emulsion may be combined and mixed in by using any mixing device compatible with the composition, e.g., a mixer, a blender, etc., to yield a SBWE.

In yet another embodiment, the AHM and the water are mixed to yield an AHM aqueous solution, for example by using any mixing device compatible with the composition, e.g., a mixer, a blender, etc. The AHM aqueous solution may be used as process water (e.g., hot water, steam, etc.) for the extraction of bitumen from its geological deposit. In such embodiment, the bitumen extracted from its geological deposit may be in the form of a SBWE, and may not require any further processing to yield the SBWE. In an alternative embodiment, the bitumen extracted from its geological deposit by using an AHM aqueous solution as process water may require further mixing, combining with additional water, combining with additional AHM, or combinations thereof, to yield the SBWE.

In still yet another embodiment, the AHM and the water are mixed by using any suitable method or process (e.g., by using any mixing device compatible with the composition, e.g., a mixer, a blender, etc.) to yield a first mixture. In such embodiment, the bitumen is added to the first mixture to yield a SBWE. The bitumen and the first mixture may be combined and mixed in by using any mixing device compatible with the composition, e.g., a mixer, a blender, etc.

In still yet another embodiment, the bitumen, the water and the AHM are combined and mixed in concurrently, for example by using any mixing device compatible with the composition, e.g., a mixer, a blender, etc.

In an embodiment, the SBWE comprises a bitumen-in-water emulsion of the oil-in-water type, wherein bitumen droplets represent the discontinuous phase of the emulsion and are dispersed throughout the water which represents the continuous phase of the emulsion. Without wishing to be limited by theory, the ability of the AHM to stabilize the bitumen-in-water emulsion is due to the presence of (i) the alkoxylating units in the structure of the AHM, which alkoxylating units are hydrophilic and provide the water solubility feature of the AHM; and (ii) the humus material structure of the AHM, which humus material is hydrophobic and it enables interaction with asphaltenes present in the bitumen, thus providing the oil solubility feature of the AHM.

In an embodiment, the bitumen droplets may have a size of from about 5 microns to about 25 microns, alternatively from about 10 microns to about 22 microns, or alternatively from about 14 micron to about 20 microns. The size of the bitumen droplets of the SBWE may be determined by microscopy, e.g., phase contrast microscopy.

In an embodiment, the SBWE of the type disclosed herein may be characterized by a plurality of properties, such as API gravity, viscosity, density, pour point, stability over time, temperature stability, flash point, calorific value, etc.

In an embodiment, the SBWE may be characterized by an API gravity of from about 7.5° API to about 9.5° API, alternatively from about 7.8° API to about 9.3° API, or alternatively from about 8.0° API to about 9.0° API. The API gravity of the SBWE may be determined by density measurements.

In an embodiment, the SBWE may be characterized by a viscosity at 20° C. of from about 300 cP to about 600 cP, alternatively from about 350 cP to about 550 cP, or alternatively from about 400 cP to about 500 cP. The viscosity of the SBWE may be determined by using a Brookfield viscometer.

In an embodiment, the SBWE may be characterized by a density at 15° C. of from about 0.95 g/cc to about 1.05 g/cc, alternatively from about 1.00 g/cc to about 1.03 g/cc, or alternatively from about 1.01 g/cc to about 1.02 g/cc. The density of the SBWE may be determined by density measurements.

In an embodiment, the SBWE may be characterized by a pour point of from about 1° C. to about 10° C., alternatively from about 2° C. to about 8° C., or alternatively from about 3° C. to about 6° C. The pour point of a liquid (e.g., SBWE) is the lowest temperature at which the liquid (e.g., SBWE) becomes semi-solid and loses its flow characteristics. The pour point of the SBWE may be determined in accordance with ASTM D5949 or a similar method.

In an embodiment, the SBWE may be characterized by stability over time of equal to or greater than 4 months, or alternatively equal to or greater than 3 months.

In an embodiment, the SBWE may be characterized by a flash point of equal to or greater than about 90° C., or alternatively equal to or greater than about 85° C. The flash point of a volatile material (e.g., SBWE) is the lowest temperature at which the volatile material (e.g., SBWE) can vaporize to form an ignitable mixture in air. The flash point of the SBWE may be determined in accordance with ASTM D93, Pensky-Martens closed cup method, or a similar method.

In an embodiment, the SBWE may be characterized by a calorific value of from about 25 MJ/kg to about 35 MJ/kg, alternatively from about 26 MJ/kg to about 32 MJ/kg, or alternatively from about 27 MJ/kg to about 31 MJ/kg. The calorific value of a material (e.g., SBWE) that is intended to be used as a fuel is the amount of heat released during the combustion of a specified amount of the material (e.g., SBWE). A fuel is a material (e.g., SBWE) that is burned to produce heat or power. The calorific value of the SBWE may be determined by calorimetry.

In an embodiment, the stabilized bitumen-in-water emulsions (SBWEs) and methods of making same disclosed herein present the advantage of employing naturally-occurring materials (e.g., bitumen, humus-based materials) that are widely-available and cost effective, thereby rendering the SBWEs cost effective.

In an embodiment, the SBWE may be advantageously stable over time as previously disclosed herein, and as such the SBWE may be advantageously stored for extended time frames and transported as needed.

In an embodiment, the SBWE may be advantageously transported, stored (prior to, during, or subsequent to transport), and/or used as a fuel (e.g., combusted in an electricity generation facility such as an electric plant, where the SBWE is used as a fuel similar to a coal or natural gas fired electrical generation facility). In an embodiment, the AHM may be advantageously combustible as part of the SBWE. In an embodiment, the SBWE may advantageously replace ORIMULSION. Additional advantages of the SBWE and/or the methods of using the same may be apparent to one of skill in the art viewing this disclosure.

Additional Disclosure

A first embodiment, which is a method of stabilizing a bitumen-in-water emulsion comprising contacting (i) bitumen, (ii) water, and (iii) an alkoxylated humus material to obtain a stabilized bitumen-in-water emulsion, wherein the alkoxylated humus material comprises an ethoxylated humus material, a C3+ alkoxylated humus material, or combinations thereof.

A second embodiment, which is the method of the first embodiment wherein the bitumen and the water are contacted to yield a base bitumen-in-water emulsion.

A third embodiment, which is the method of the second embodiment wherein the ethoxylated humus material and/or the C3+ alkoxylated humus material is added to the base bitumen-in-water emulsion to obtain a stabilized bitumen-in-water emulsion.

A fourth embodiment, which is the method of any of the first through the third embodiments wherein the bitumen comprises natural bitumen, extra-heavy oils, or combinations thereof.

A fifth embodiment, which is the method of any of the first through the fourth embodiments wherein the bitumen is extracted from the Orinoco Oil Belt in Venezuela.

A sixth embodiment, which is the method of any of the first through the fifth embodiments wherein the bitumen is present in the stabilized bitumen-in-water emulsion in an amount of from about 40 vol. % to about 85 vol. % based on the total volume of the stabilized bitumen-in-water emulsion.

A seventh embodiment, which is the method of any of the first through the sixth embodiments wherein the water comprises fresh water.

An eighth embodiment, which is the method of any of the first through the seventh embodiments wherein the water is present in the stabilized bitumen-in-water emulsion in an amount of from about 15 vol. % to about 60 vol. % based on the total volume of the stabilized bitumen-in-water emulsion.

A ninth embodiment, which is the method of any of the first through the eighth embodiments wherein the alkoxylated humus material is obtained by heating a humus material with an alkoxylating agent, in the presence of a catalyst and an inert reaction solvent, wherein the alkoxylating agent comprises ethylene oxide, a C3+ cyclic ether, or combinations thereof.

A tenth embodiment, which is the method of the ninth embodiment wherein the humus material comprises brown coal, lignite, subbituminous coal, leonardite, humic acid, a compound characterized by Structure I, fulvic acid, humin, peat, lignin, or combinations thereof:

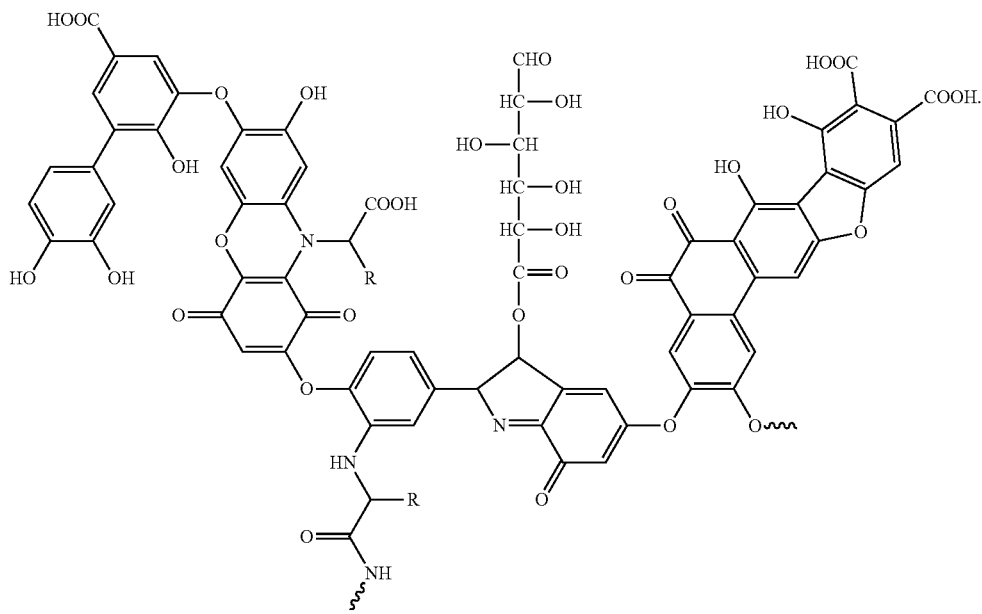

Structure I

An eleventh embodiment, which is the method of any of the ninth through the tenth embodiments wherein the C3+ cyclic ether comprises oxetane as characterized by Structure II, a C3+ epoxide compound characterized by Structure III, or combinations thereof,

Structure II

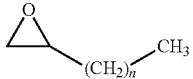

Structure III wherein the repeating methylene (—CH$_2$—) unit may occur n times with the value of n ranging from about 0 to about 3.

A twelfth embodiment, which is the method of the eleventh embodiment wherein the C3+ epoxide compound characterized by Structure III comprises propylene oxide as characterized by Structure IV, butylene oxide as characterized by Structure V, pentylene oxide as characterized by Structure VI, or combinations thereof.

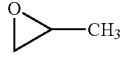

Structure IV

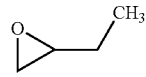

Structure V

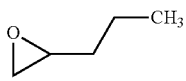

Structure VI

A thirteenth embodiment, which is the method of any of the ninth through the twelfth embodiments wherein the alkoxylating agent is present in a weight ratio of alkoxylating agent to humus material of from about 0.5:1 to about 50:1.

A fourteenth embodiment, which is the method of any of the ninth through the thirteenth embodiment wherein the alkoxylating agent comprises ethylene oxide and C3+ cyclic ether in a weight ratio of ethylene oxide to C3+ cyclic ether in the range of from about 10:1 to about 1:10.

A fifteenth embodiment, which is the method of any of the ninth through the fourteenth embodiment wherein the catalyst comprises a strong base catalyst and the C3+ alkoxylated humus material comprises a compound characterized by Structure VII:

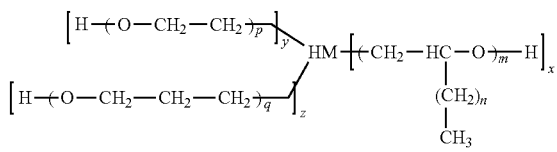

Structure VII wherein HM represents the humus material; n is in the range of from about 0 to about 3; m is in the range of from about 1 to about 30; x is in the range of from about 0 to about 300, per 100 g of humus material; p is in the range of from about 1 to about 30; y is in the range of from about 0 to about 200, per 100 g of humus material; q is in the range of from about 1 to about 30; z is in the range of from about 0 to about 300, per 100 g of humus material; and x, y and z cannot all be 0 at the same time.

A sixteenth embodiment, which is the method of any of the ninth through the fourteenth embodiments wherein the catalyst comprises a strong acid catalyst and the C3+ alkoxylated humus material comprises a compound characterized by Structure VIII:

Structure VIII

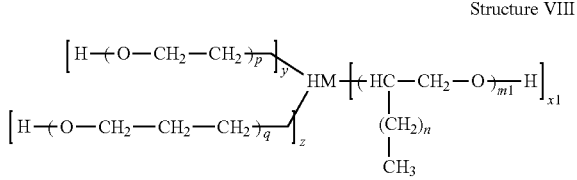

wherein HM represents the humus material; n is in the range of from about 0 to about 3; m1 is in the range of from about 1 to about 30; x1 is in the range of from about 0 to about 300, per 100 g of humus material; p is in the range of from about 1 to about 30; y is in the range of from about 0 to about 200, per 100 g of humus material; q is in the range of from about 1 to about 30; z is in the range of from about 0 to about 300, per 100 g of humus material; and x1, y and z cannot all be 0 at the same time.

A seventeenth embodiment, which is the method of any of the first through the tenth embodiments wherein the ethoxylated humus material comprises a compound characterized by Structure XL:

Structure XL

wherein HM represents the humus material; p is in the range of from about 1 to about 30; and y is in the range of from about 1 to about 200, per 100 g of humus material.

An eighteenth embodiment, which is the method of any of the first through the seventeenth embodiments wherein the alkoxylated humus material has a hydrophilic-lipophilic balance of from about 11 to about 20.

A nineteenth embodiment, which is the method of any of the first through the eighteenth embodiments wherein the alkoxylated humus material is present in the stabilized bitumen-in-water emulsion in an amount of from about 0.1 vol. % to about 2 vol. % based on the total volume of the stabilized bitumen-in-water emulsion.

A twentieth embodiment, which is the method of any of the first through the nineteenth embodiments further comprising a step selected from the group consisting of: storing the stabilized bitumen-in-water emulsion, transporting the stabilized bitumen-in-water emulsion, combusting the stabilized bitumen-in-water emulsion, and combinations thereof.

A twenty-first embodiment, which is a method of stabilizing a bitumen-in-water emulsion comprising:
contacting (i) bitumen, (ii) water, and (iii) an alkoxylated humus material to obtain a stabilized bitumen-in-water emulsion, wherein the alkoxylated humus material comprises an ethoxylated lignite, and the bitumen is extracted from the Orinoco Oil Belt in Venezuela.

A twenty-second embodiment, which is a stabilized bitumen-in-water emulsion comprising bitumen, water, and an alkoxylated humus material; wherein the alkoxylated humus material comprises an ethoxylated humus material, a C3+ alkoxylated humus material, or combinations thereof.

A twenty-third embodiment, which is the stabilized bitumen-in-water emulsion of the twenty-second embodiment comprising bitumen droplets having a size of from about 5 microns to about 20 microns.

A twenty-fourth embodiment, which is the stabilized bitumen-in-water emulsion of any of the twenty-second through the twenty-third embodiments having a calorific value of from about 25 MJ/kg to about 35 MJ/kg.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of stabilizing a bitumen-in-water emulsion comprising:
    contacting (i) bitumen, (ii) water, and (iii) an alkoxylated humus material to obtain a stabilized bitumen-in-water emulsion, wherein the alkoxylated humus material comprises an ethoxylated humus material, a C3+ alkoxylated humus material, or combinations thereof.

2. The method of claim 1 wherein the bitumen comprises natural bitumen, extra-heavy oils, or combinations thereof.

3. The method of claim 1 wherein the bitumen is present in the stabilized bitumen-in-water emulsion in an amount of from about 40 vol. % to about 85 vol. % based on the total volume of the stabilized bitumen-in-water emulsion.

4. The method of claim 1 wherein the water comprises fresh water.

5. The method of claim 1 wherein the water is present in the stabilized bitumen-in-water emulsion in an amount of from about 15 vol. % to about 60 vol. % based on the total volume of the stabilized bitumen-in-water emulsion.

6. The method of claim 1 wherein the alkoxylated humus material is obtained by heating a humus material with an alkoxylating agent, in the presence of a catalyst and an inert reaction solvent, wherein the alkoxylating agent comprises ethylene oxide, a C3+ cyclic ether, or combinations thereof.

7. The method of claim 6 wherein the humus material comprises brown coal, lignite, subbituminous coal, leonardite, humic acid, a compound characterized by Structure I, fulvic acid, humin, peat, lignin, or combinations thereof:

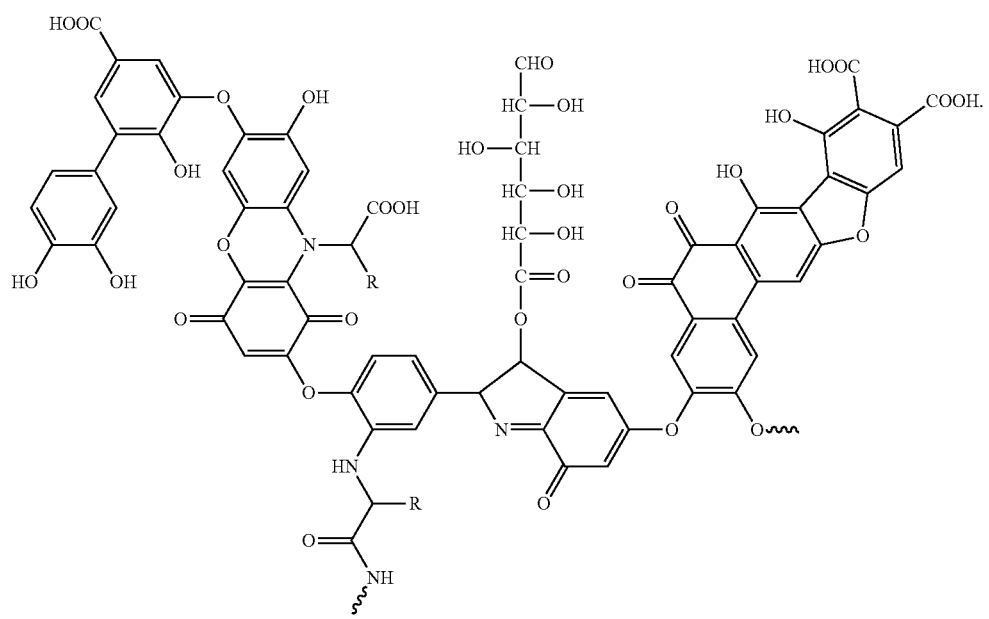

Structure I

8. The method of claim 6 wherein the C3+ cyclic ether comprises oxetane as characterized by Structure II, a C3+ epoxide compound characterized by Structure III, or combinations thereof,

Structure II

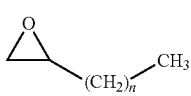

Structure III wherein the repeating methylene (—$CH_2$—) unit may occur n times with the value of n ranging from about 0 to about 3.

9. The method of claim 8 wherein the C3+ epoxide compound characterized by Structure III comprises propylene oxide as characterized by Structure IV, butylene oxide as characterized by Structure V, pentylene oxide as characterized by Structure VI, or combinations thereof.

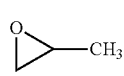

Structure IV

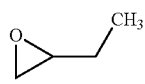

Structure V

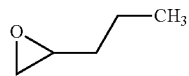

Structure VI

10. The method of claim 6 wherein the alkoxylating agent is present in a weight ratio of alkoxylating agent to humus material of from about 0.5:1 to about 50:1.

11. The method of claim 6 wherein the alkoxylating agent comprises ethylene oxide and C3+ cyclic ether in a weight ratio of ethylene oxide to C3+ cyclic ether in the range of from about 10:1 to about 1:10.

12. The method of claim 6 wherein the catalyst comprises a strong base catalyst and the C3+ alkoxylated humus material comprises a compound characterized by Structure VII:

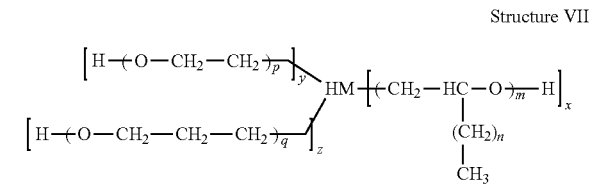

Structure VII wherein HM represents the humus material; n is in the range of from about 0 to about 3; m is in the range of from about 1 to about 30; x is in the range of from about 0 to about 300, per 100 g of humus material; p is in the range of from about 1 to about 30; y is in the range of from about 0 to about 200, per 100 g of humus material; q is in the range of from about 1 to about 30; z is in the range of from about 0 to about 300, per 100 g of humus material; and x, y and z cannot all be 0 at the same time.

13. The method of claim 6 wherein the catalyst comprises a strong acid catalyst and the C3+ alkoxylated humus material comprises a compound characterized by Structure VIII:

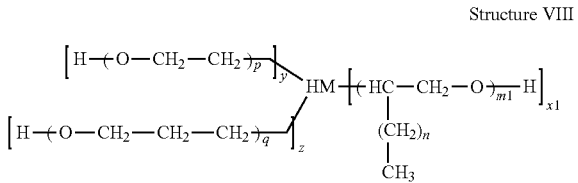

Structure VIII wherein HM represents the humus material; n is in the range of from about 0 to about 3; m1 is in the range of from about 1 to about 30; x1 is in the range of from about 0 to about 300, per 100 g of humus material; p is in the range of from about 1 to about 30; y is in the range of from about 0 to about 200, per 100 g of humus material; q is in the range of from about 1 to about 30; z is in the range of from about 0 to about 300, per 100 g of humus material; and x 1, y and z cannot all be 0 at the same time.

14. The method of claim 1 wherein the ethoxylated humus material comprises a compound characterized by Structure XL:

Structure XL wherein HM represents the humus material; p is in the range of from about 1 to about 30; and y is in the range of from about 1 to about 200, per 100 g of humus material.

15. The method of claim 1 wherein the alkoxylated humus material has a hydrophilic-lipophilic balance of from about 11 to about 20.

16. The method of claim 1 wherein the alkoxylated humus material is present in the stabilized bitumen-in-water emulsion in an amount of from about 0.1 vol. % to about 2 vol. % based on the total volume of the stabilized bitumen-in-water emulsion.

17. The method of claim 1 further comprising a step selected from the group consisting of: storing the stabilized bitumen-in-water emulsion, transporting the stabilized bitumen-in-water emulsion, combusting the stabilized bitumen-in-water emulsion, and combinations thereof.

18. A stabilized bitumen-in-water emulsion comprising bitumen, water, and an alkoxylated humus material; wherein the alkoxylated humus material comprises an ethoxylated humus material, a C3+ alkoxylated humus material, or combinations thereof.

19. The stabilized bitumen-in-water emulsion of claim 18 comprising bitumen droplets having a size of from about 5 microns to about 20 microns.

20. The stabilized bitumen-in-water emulsion of claim 18 having a calorific value of from about 25 MJ/kg to about 35 MJ/kg.

* * * * *